United States Patent
Burckart et al.

(10) Patent No.: US 9,026,631 B2
(45) Date of Patent: May 5, 2015

(54) BUSINESS-TO-BUSINESS SOCIAL NETWORK

(75) Inventors: Erik J. Burckart, Raleigh, NC (US); Andrew Ivory, Wake Forest, NC (US); John F. Schumacher, Chapel Hill, NC (US); Aaron K. Shook, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 613 days.

(21) Appl. No.: 13/356,795

(22) Filed: Jan. 24, 2012

(65) Prior Publication Data

US 2013/0191464 A1    Jul. 25, 2013

(51) Int. Cl.
G06F 15/173    (2006.01)
*G06Q 10/06*    (2012.01)
*G06Q 50/00*    (2012.01)

(52) U.S. Cl.
CPC .............. *G06Q 10/067* (2013.01); *G06Q 50/01* (2013.01)

(58) Field of Classification Search
USPC ......................................... 709/203, 217, 223
See application file for complete search history.

(56) References Cited

U.S. PATENT DOCUMENTS

| 7,571,166 | B1 | 8/2009 | Davies et al. | |
|---|---|---|---|---|
| 2002/0095457 | A1 | 7/2002 | Sharma et al. | |
| 2002/0143692 | A1* | 10/2002 | Heimermann et al. | 705/37 |
| 2003/0236776 | A1* | 12/2003 | Nishimura et al. | 707/3 |
| 2004/0078430 | A1* | 4/2004 | Aubert et al. | 709/204 |
| 2008/0120129 | A1* | 5/2008 | Seubert et al. | 705/1 |
| 2008/0172344 | A1 | 7/2008 | Eager et al. | |
| 2009/0292589 | A1* | 11/2009 | Marsh et al. | 705/10 |
| 2010/0094674 | A1 | 4/2010 | Marriner et al. | |
| 2011/0258049 | A1* | 10/2011 | Ramer et al. | 705/14.66 |

OTHER PUBLICATIONS

Mell, P., et al., "The NIST Definition of Could Computing", U.S. Department of Commerce, Computer Security Division, Information Technology Laboratory, National Institute of Standards and Technology, Gaithersburg, MD 20899-8930, Sep. 2011.

* cited by examiner

*Primary Examiner* — Phuoc Nguyen
(74) *Attorney, Agent, or Firm* — Carol E. Thorstad Forsyth, Esq.; Fox Rothschild LLP

(57) ABSTRACT

Systems and methods for providing a social network. The methods involve: creating a relationship between a first entity and a second entity; setting authorization which indicates that a user of said first entity is authorized to view inventory data of said second entity; receiving a request to view first inventory data of said first entity and second inventory data of said second entity by said user; and determining whether said user is authorized to view said second inventory data. If said user is authorized: querying a first remote inventory management system of said first entity for said first inventory data and a second remote inventory management system of said second entity for said second inventory data; receiving said first and second inventory data; generating an aggregate view comprising said first and second inventory data; and providing content of said aggregate view to a client computing device of said first entity.

36 Claims, 26 Drawing Sheets

Products Table
$514_5$

ProductID : PK
Product Name: String
Product Description: String
<<0..n>> Product Category ID
<<1..n>> Manufacturer Organization ID

Inventory Locations Table
$514_6$

<<1..1>> Product ID
<<1..1>> Location ID
TotalQuantity : Integer
QuantitySold : Integer
QuantityAvailable : Integer

Purchase Orders Table
$514_7$

PurchaseOrderID : PK
<<1..1>> Buyer Organization ID
<<1..1>> Seller Organization ID
<<1..1>> Product ID
Quantity : Integer
Unit Price : Float

FIG. 6B

Relationships Table
516₅

RelationshipID
<<1..1>> Source Organization: Organization
<<1..1>> Target Organization: Organization
<<0..n>> InventoryAccess Rules : InventoryAccess Rule

Access Rules Table
516₆

AccessID
<<1..n>> Roles : Role
<<0..n>> Regions
<<0..n>> Locations
<<0..n>> Product Categories
<<0..n>> Product IDs

Views Table
516₇

ViewID : PK
<<0..n>> Account ID
<<0..n>> Access ID
<<1..n>> Query: String

Transactions Table
516₈

TransactionID : PK
Transaction Type : String
<<0..n>> Product ID
<<0..n>> Account ID
<<1..n>> Organization ID

FIG. 7B

| View ▼ | Filters ▼ | Sort ▼ | | |
|---|---|---|---|---|
| Active Filters: | Region: SE (x) | Manufacturer: Entity E (x) | | |
| Location | Product Category | Product | Available Quantity | Total Quantity |
| RS1 | Power Tools | E123 | 12 | 12 |
| RS1 | Power Tools | F456 | 15 | 15 |
| RS2 | Power Tools | E123 | 145 | 190 |
| RS2 | Power Tools | E456 | 261 | 311 |
| DC1 | Power Tools | E123 | 47 | 63 |
| DC1 | Power Tools | E456 | 81 | 105 |
| DC1 | Power Tools | E789 | 24 | 38 |

FIG. 23    2300

| View ▼ | Filters ▼ | Sort ▼ | |
|---|---|---|---|
| Active Filters: | Region: SE (x) | Manufacturer: Entity E (x) | |
| | Product: E123 (x) | | |
| Location | Product Category | Available Quantity | Total Quantity |
| RS1 | Power Tools | 12 | 12 |
| RS2 | Power Tools | 145 | 190 |
| DC1 | Power Tools | 47 | 63 |
| E1 | Power Tools | 503 | 602 |

| View ▼ | Filters ▼ | Sort ▼ | |
|---|---|---|---|
| Active Filters: | Region: SE (x) | Product Category: Power Tools (x) | |

| Location | Product Category | Available Quantity | Total Quantity |
|---|---|---|---|
| RS1 | Power Tools | 439 | 439 |
| RS2 | Power Tools | 2,305 | 2,640 |
| DC1 | Power Tools | 1,412 | 1,743 |
| E1 | Power Tools | 7,133 | 9,082 |

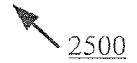
2500

FIG. 25

| View ▼ | Filters ▼ | Sort ▼ | |
|---|---|---|---|
| Active Filters: | Region: SE (x) | Location: RS1 (x) | Product Category: Tools (x) |

| Product Sub-Category | Available Quantity | Total Quantity |
|---|---|---|
| Power Tools | 439 | 439 |
| Cordless Tools | 113 | 113 |
| Air Tools | 42 | 42 |

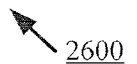
2600

FIG. 26

Inventory-related message

Transaction Type: Purchase Order
Buyer Organization: Entity A
Seller Organization: Entity E
Product ID: E123
Unit Price: $4.15
Quantity: 150
Delivery Date: January 30, 2012
Delivery Location: RS1
Initiating User Name: Bob

FIG. 29    2900

Web Browser Application Window    = ☐ X
File  Edit  Tool  Help

Logged in as: Bob            Organization: Entity A

Create New Custom View:

Organization:     | Entity E ▼ |  ◀— 3002
Region:           | Southeast US ▼ |  ◀— 3004
Product Category: | Power Tools ▼ |  ◀— 3006
Location:         | RS1 ▼ |  ◀— 3008

FIG. 30    3000

BUSINESS-TO-BUSINESS SOCIAL NETWORK

BACKGROUND

The invention concerns computing systems. More particularly, the invention concerns systems and methods for providing a Business-to-Business ("B2B") social network.

Modern commerce is a complex undertaking, especially for large corporations with many assets in diverse geographic locations. Modern commercial entities often distribute administrative workload (e.g., asset management) amongst many employees in many locations. Modern commercial entities also form business relationships with many other commercial entities, such as partners, buyers, sellers, and distributors. For example, a corporate retail entity may operate hundreds of retail stores and purchase goods from hundreds of different suppliers. A retail entity may receive shipments from a variety of shipping and distribution entities at various locations, such as warehouses and retail stores. A retail entity may perform distribution of the goods to the various retail stores. For certain goods or for certain suppliers, a retail entity may allow the supplier to manage inventory in the retail entity's retail stores (i.e., "vendor-managed inventory").

Many different electronic inventory management systems are available from various hardware and software vendors for assisting commercial entities in the management of their inventory. Each of the electronic inventory management systems is generally not compatible with other electronic inventory management systems. In this regard, it should be understood that there is no universally adopted data format for storing or communicating inventory data between different electronic inventory management systems.

SUMMARY

Embodiments of the present invention concern systems and methods for providing a Business-to-Business ("B2B") social network. The methods generally involve: creating a business relationship between a first entity and at least one second entity in the B2B social network; setting at least one parameter which indicates that at least one user of the first entity is authorized to view inventory data of the second entity; receiving a request by the user to view first inventory data of the first entity and second inventory data of a second entity; and determining whether the user is authorized to view the second inventory data based on the parameter. If it is determined that the user is not authorized to view the second inventory data, then the request may be denied or an aggregate view creation process is performed without the second inventory data. Alternatively, if it is determined that the user is authorized to view the second inventory data, then the following operations are performed: querying a first remote inventory management system of the first entity for the first inventory data; querying a second remote inventory management system of the second entity for the second inventory data; receiving the first inventory data and the second inventory data; generating an aggregate view comprising the first and second inventory data; and providing content of the aggregate view to a client computing device of the first entity.

Embodiments of the present invention also concern systems and methods for interfacing an inventory management system to a social network. The methods generally involve: receiving a first message from a first computing device of a first entity; and processing the first message to determine if it is an inventory-related message. If the message is not an inventory-related message, then the first message is sent to a second computing device of the second entity. Alternatively, if the first message is an inventory-related message, then pre-defined inventory-related data is extracted from the first message. Also, a second message is generated which comprises the extracted inventory-related data. Thereafter, the first message is sent to a second computing device of the second entity. The second message is sent to a third computing device of a social network service provider.

BRIEF DESCRIPTION OF THE SEVERAL VIEWS OF THE DRAWINGS

Exemplary embodiments will be described with reference to the following drawing figures, in which like numerals represent like items throughout the figures, and in which:

FIGS. 6A-6B collectively provide a schematic illustration of exemplary relations in a relational data model that are useful for understanding the present invention.

FIGS. 7A-7B collectively provide a schematic illustration of an exemplary relations in a relational data model that are useful for understanding the present invention.

FIGS. 23-26 each provide a schematic illustration of an exemplary aggregate view that is useful for understanding the present invention.

FIG. 29 is a schematic illustration of an exemplary inventory-related message content that is useful for understanding the present invention.

FIG. 30 is a schematic illustration of an exemplary web page for creating a custom aggregate view that is useful for understanding the present invention.

DETAILED DESCRIPTION

Figure 1:
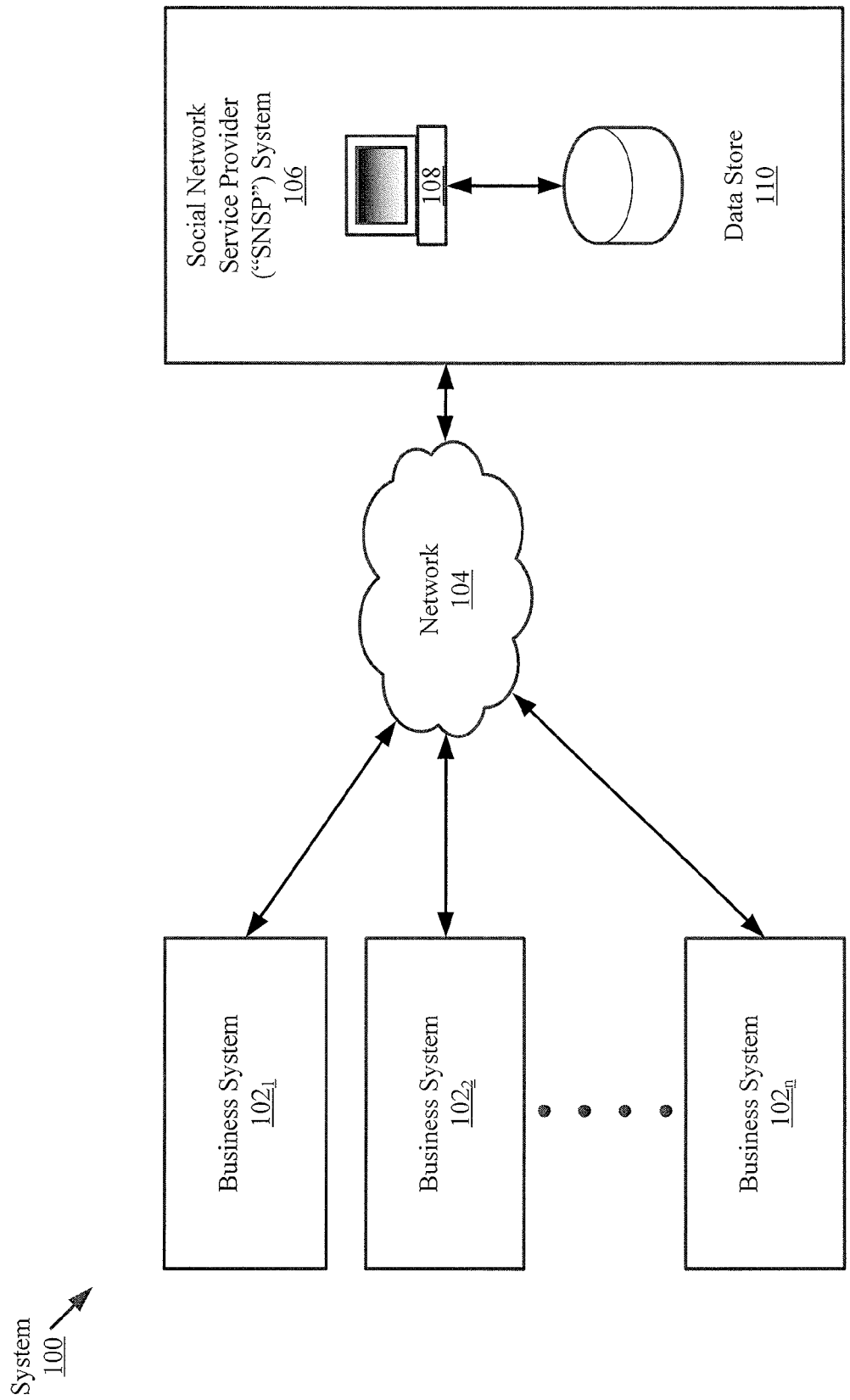
FIG. 1 is a schematic illustration of an exemplary computing system that is useful for understanding the present invention.

The present invention is described with reference to the attached figures. The figures are not drawn to scale and they are provided merely to illustrate exemplary embodiments of the present invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Exemplary embodiments of the present invention are generally directed to implementing systems and methods for providing a B2B social network. In this regard, embodiments of the present invention implement novel techniques for (a) inventory management, (b) distributing workload amongst employees, and (c) interfacing a plurality of different inventory management software applications. The listed features (a), (b) and (c) of the present invention will become more evident as the discussion progresses. Still, it should be understood that embodiments of the present invention overcome various shortcomings of conventional inventory management systems, such as those described above in the background section of this document. For example, embodiments of the present invention provide a more efficient, complete, and user-friendly solution as compared to that of conventional inventory management systems, such as those described above in relation to the background section of this document. Embodiments of the present invention also provide a less time consuming and costly inventory data analysis process as compared to that of the conventional inventory management systems.

The present invention can be used in a variety of applications. Such applications include, but are not limited to, commercial buyer-seller applications, medical applications, military applications and any other application in which inventory needs to be managed. Exemplary implementing system embodiments of the present invention will be described below in relation to FIGS. 1-7B. Exemplary method embodiments of the present invention will be described below in relation to FIGS. 8A-30.

Exemplary Systems Implementing the Present Invention

Referring now to FIG. 1, there is provided a schematic illustration of an exemplary system 100 that is useful for understanding the present invention. As shown in FIG. 1, system 100 comprises a plurality of business systems $102_1$, $102_2$, . . . , $102_n$, a network 104, and an SNSP system 106. Network 104 includes, but is not limited to, a Wide Area Network ("WAN"). The WAN can include, but is not limited to, the Internet. The system 100 may include more, less or different components than those illustrated in FIG. 1. However, the components shown are sufficient to disclose an illustrative embodiment implementing the present invention.

The hardware architecture of FIG. 1 represents one embodiment of a representative system configured to provide a B2B social network. As such, system 100 implements a method for providing a B2B social network in accordance with embodiments of the present invention. The method will be described in detail below in relation to FIGS. 8A-30. However, it should be understood that the method implements a novel technique for (a) inventory management, (b) distributing workload amongst employees, and (c) interfacing a plurality of different inventory management software applications.

Business systems $102_1$, $102_2$, . . . , $102_n$ and SNSP system 106 collectively facilitate the provision of B2B social network services to users thereof. Accordingly, each of the business systems $102_1$, $102_2$, . . . , $102_n$ comprises at least one computing device having installed thereon a web browser software application. Web browser software applications are well known in the art, and therefore will not be described in detail herein. However, it should be understood that the web browser software application is configured to retrieve, present and traverse information resources on the World Wide Web ("WWW"). Each of the information resources is identified by a unique Uniform Resource Identifier ("URI"). The information resources include, but are not limited to, web pages, images, videos, and other content. The business systems $102_1$, $102_2$, . . . , $102_n$ will be described in more detail below in relation to FIG. 4.

The SNSP system 106 is configured to provide B2B social network services to clients via network 104. As such, the SNSP system 106 comprises a computing device 108 and a data store 110. The computing device 108 is generally configured to host a B2B social network, which involves managing relationships and permissions, querying business systems $102_1, 102_2, \ldots, 102_n$ for inventory data, and providing aggregate inventory data to users based on the relationships and/or permissions.

The computing device 108 is also configured to generate aggregate views and write data associated with the aggregate views to the data store 110. The phrase "aggregate view", as used herein, refers to a view that includes data from multiple data stores of at least two different entities. The term "view", as used herein, refers to any type of stored query and/or result of a query. For example, a view can comprise a virtual table accessible in a Relational Database Management System ("RDBMS"), wherein the stored query is directed to at least one underlying "base" table. A view can comprise a virtual view or a materialized view, as is known in the art. A materialized view is a stored data structure that is usable like a table and that is computed or collated from data in one or more data stores. A virtual view comprises a virtual data structure that is computed or collated from data in one or more data stores. In some embodiments of the present invention, a "view" may comprise a Structured Query Language ("SQL") query stored as a text string in a data store. The computing device 108 will be described in more detail below in relation to FIG. 2.

Figure 3:
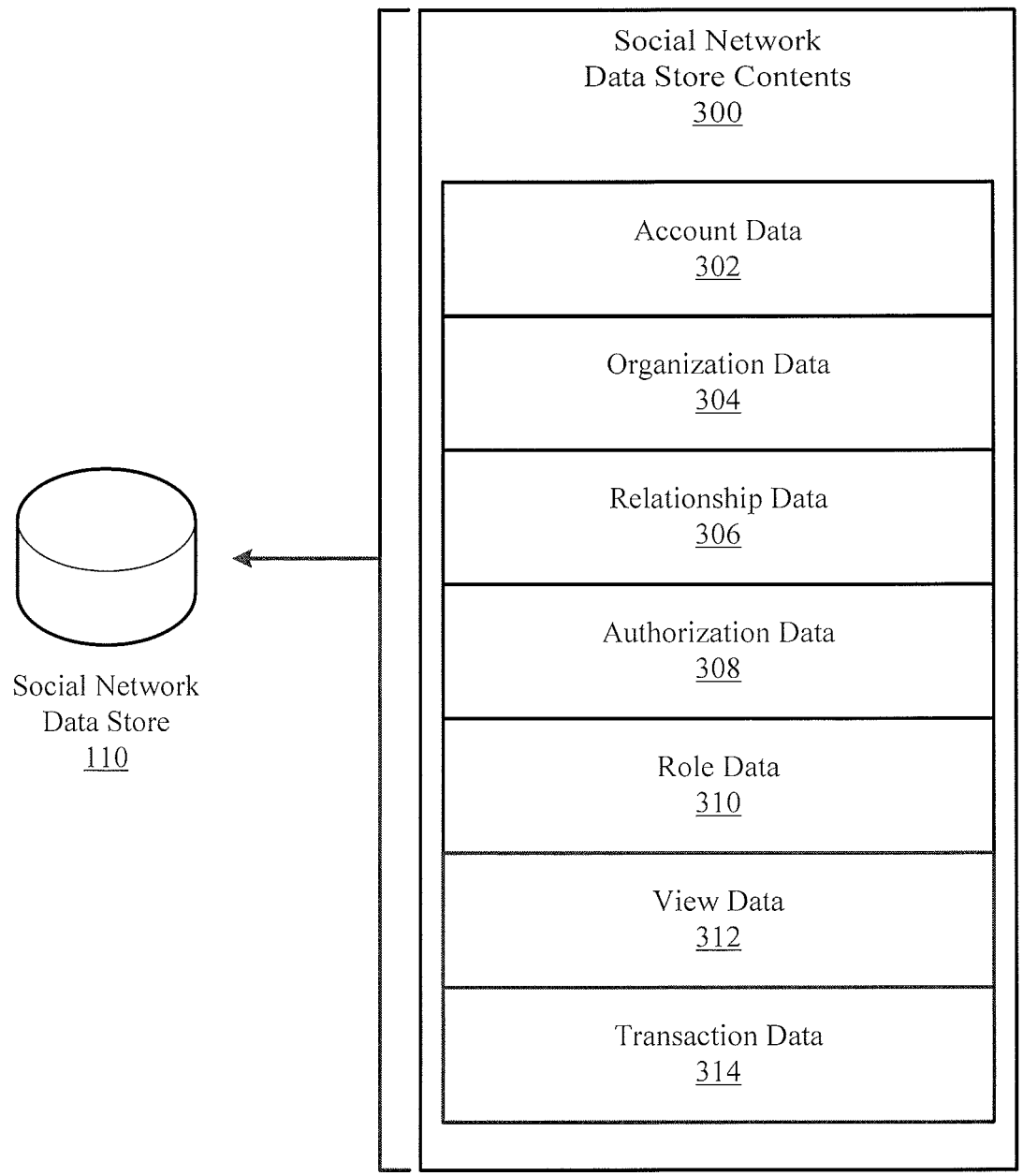
FIG. 3 is a schematic illustration of an exemplary data store of a Social Network Service Provider ("SNSP") system that is useful for understanding the present invention.

The data store 110 is generally configured to store data that is useful for providing various B2B social network services to users of business systems $102_1, 102_2, \ldots, 102_n$. A schematic illustration of exemplary types of data that can be stored in data store 110 is provided in FIG. 3. As shown in FIG. 3, the data includes account data 302, organizational data 304, relationship data 306, authorization data 308, role data 310, view data 312 and transaction data 314. The particularities of each of the listed types of data 302-314 will become more apparent as the discussion progress.

Figure 2:
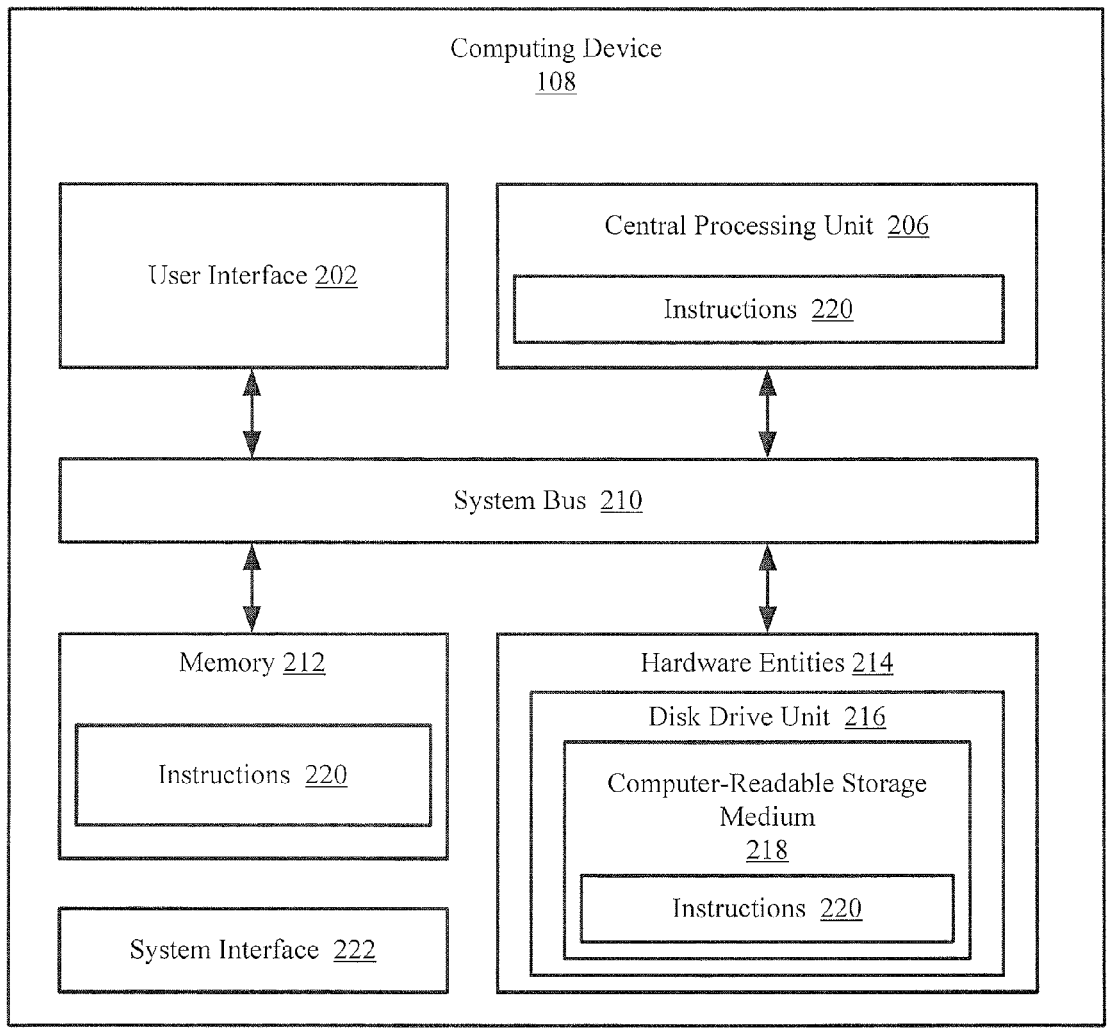
FIG. 2 is a schematic illustration of an exemplary computing device that is useful for understanding the present invention.

Referring now to FIG. 2, there is provided a block diagram of an exemplary embodiment of the computing device 108 of FIG. 1. The computing device 108 can include, but is not limited to, a notebook, a desktop computer, a laptop computer, a personal digital assistant, and a tablet PC. Notably, some or all the components of the computing device 108 can be implemented as hardware, software and/or a combination of hardware and software. The hardware includes, but is not limited to, one or more electronic circuits. Examples of hardware components include mainframes, Reduced Instruction Set Computer ("RISC") architecture based servers, storage devices, networks and networking components. Examples of software components include network application server software and database software.

The computing device 108 may include more or less components than those shown in FIG. 2. However, the components shown are sufficient to disclose an illustrative embodiment implementing the present invention. The hardware architecture of FIG. 2 represents one embodiment of a representative computing device configured to facilitate the provision of a B2B social network. As such, the computing device 108 of FIG. 2 implements improved methods for inventory management and interoperability between a plurality of different inventory management software applications in accordance with embodiments of the present invention.

As shown in FIG. 2, the computing device 108 includes a system interface 222, a user interface 202, a Central Processing Unit ("CPU") 206, a system bus 210, a memory 212 connected to and accessible by other portions of computing device 108 through system bus 210, and hardware entities 214 connected to a system bus 210. At least some of the hardware entities 214 perform actions involving access to and use of memory 212, which can be a Random Access Memory ("RAM"), a disk driver and/or a Compact Disc Read Only Memory ("CD-ROM").

System interface 222 allows the computing device 108 to communicate directly or indirectly with external communication devices (e.g., communication devices of business systems $102_1, 102_2, \ldots, 102_n$ of FIG. 1). For example, computing device 108 may communicate indirectly with an external communication device by sending and receiving communications through a common network (e.g., network 104 shown in FIG. 1).

Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 108. The memory 212 and the CPU 206 also can constitute machine-readable media. The term "machine-readable media", as used herein, refers to a single medium or multiple media (e.g., a centralized or distributed database, and/or associated caches and servers) that store the one or more sets of instructions 220. The term "machine-readable media", as used herein, also refers to any medium that is capable of storing, encoding or carrying a set of instructions 220 for execution by the computing device 108 and that cause the computing device 108 to perform any one or more of the methodologies of the present disclosure.

In some embodiments of the present invention, the hardware entities 214 include an electronic circuit (e.g., a processor) programmed for facilitating the provision of B2B social network services to clients via network 104. In this regard, it should be understood that the electronic circuit can access and run B2B social network software applications (not shown in FIG. 2) installed on the computing device 108. The B2B social network software applications are generally operative to facilitate the provision of a variety of services to users of a B2B social network. These services include, but are not limited to business relationship creation services, access management services, permission based services, and aggregate view based services. The business relationship creation services are provided for allowing users to create relationships between business entities within the B2B social network. The access management services are provided for allowing users to manage employee accesses to the B2B social network. The permission based services are provided for allowing users to manage access permissions for inventory data. The aggregate view based services are provided for allowing users to specify the content to be included in an aggregate view and to initiate the generation of an aggregate view based on the user specified content. The listed services and other services provided by the B2B social network software will become more apparent as the discussion progresses.

Figure 4:
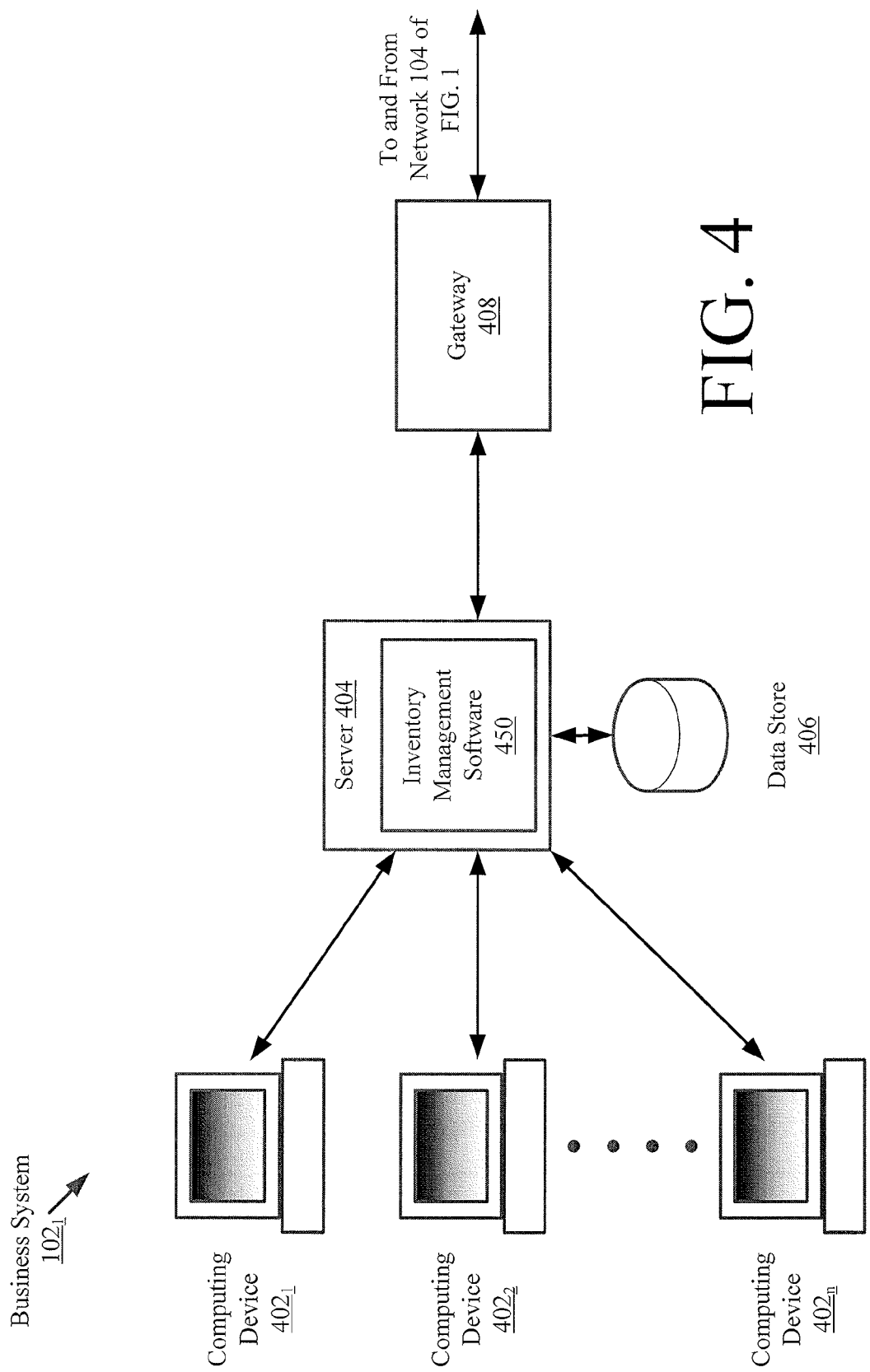
FIG. 4 is a schematic illustration of an exemplary business system that is useful for understanding the present invention.

Referring now to FIG. 4, there is provided a schematic illustration of an exemplary embodiment of the business system $102_1$. The business systems $102_2, \ldots, 102_n$ of FIG. 1 can be the same as or similar to business system $102_1$. As such, the following discussion of business system $102_1$ is sufficient for understanding business systems $102_2, \ldots, 102_n$ of FIG. 1. Notably, some or all the components of the business system $102_1$ can be implemented as hardware, software and/or a combination of hardware and software. The hardware includes, but is not limited to, one or more electronic circuits.

Notably, the business system $102_1$ may include more or less components than those shown in FIG. 4. However, the components shown are sufficient to disclose an illustrative embodiment implementing the present invention. The hardware architecture of FIG. 4 represents one embodiment of a representative business system $102_1$ configured to facilitate the provision of B2B social network services to users thereof. As such, the business system $102_1$ of FIG. 4 implements improved methods for inventory management in accordance with embodiments of the present invention.

As shown in FIG. 4, an exemplary business system $102_1$ comprises computing devices $402_1, 402_2, \ldots, 402_n$, a server 404, a data store 406 and a gateway 408. Each of the computing devices $402_1, 402_2, \ldots, 402_n$ can include, but is not limited to, a notebook computer, a desktop computer, a laptop computer, a personal digital assistant, and a tablet PC. Each of the computing devices $402_1, 402_2, \ldots, 402_n$ is also configured to facilitate inventory management by users thereof. Accordingly, each of the computing devices $402_1, 402_2, \ldots, 402_n$ may have installed thereon an inventory management software application (not shown in FIG. 4). Inventory management software applications are well known in the art, and therefore will not be described in detail herein. However, it should be understood that the inventory management software application allows a user to view details about inventory of a single business entity, a particular retail store of the business entity, and a plurality of retail stores of the business entity that are located within a particular geographic region. The inventory management software applications also facilitate the placement of orders for products sold by select suppliers and the presentation of information relating to the status of said orders.

Each of the computing devices $402_1, 402_2, \ldots, 402_n$ is also configured to allow a user to access a B2B social network website and use services of the B2B social network website. Accordingly, each of the computing devices $402_1, 402_2, \ldots, 402_n$ has installed thereon a web browser software application (not shown in FIG. 4). The web browser software application retrieves, presents and traverses web pages of the B2B social network website.

Server 404 is configured to facilitate inventory management by users located in the same or different geographic locations. As such, server 404 has installed thereon inventory management software 450. The inventory management software is operative to: receive user input from users of computing devices $402_1, 402_2, \ldots, 402_n$; initiate inventory based transactions (e.g., purchase orders); generate messages including inventory based information (e.g., information relating to a purchase orders); communicate the messages to remote systems; read inventory related data from data store 406; and write inventory related data to data store 406. The inventory related data includes, but is not limited to, data describing inventory (e.g., quantity of "in stock" products at retail locations) and data describing particularities of inventory-related transactions (e.g., data specifying prices for items identified in a purchase order and delivery parameters specified in the purchase order).

Gateway 408 comprises a computing device configured to receive inventory management messages from the server 404 and/or a network (e.g., network 104 of FIG. 1). The gateway 408 is configured to process and/or analyze the received messages and perform specific actions based on message content. For example, the gateway 408 may be configured to receive a purchase order message from inventory management software 450 executing on server 404 and process the purchase order message to extract a pre-defined or pre-selected set of information. The gateway may be configured to forward messages to other business systems $102_1, 102_2 \ldots 102_n$ and/or to SNSP system 106 as discussed in detail below. Gateway 408 may also be configured to receive queries from SNSP system 106 and convert received queries to an appropriate format for querying data store 406. The functions and operations of gateway 408 are described in more detail below.

Figure 5:
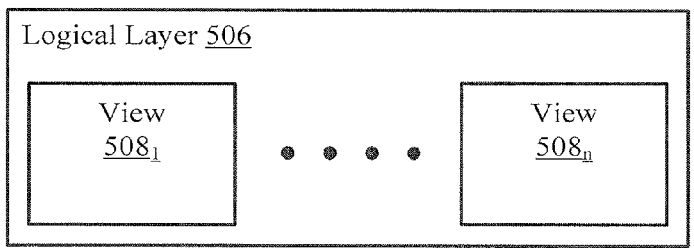
FIG. 5 is a schematic illustration of an exemplary data model that is useful for understanding the present invention.

Referring now to FIG. 5, there is provided a schematic illustration of an exemplary data model 500 that is useful for understanding the present invention. As shown in FIG. 5, the data model 500 comprises a physical layer 502, a conceptual layer 504, and a logical layer 506. Physical layer 502 corresponds to the physical location of data. Physical layer 502 comprises data physically stored in data store 406 of FIG. 4 (e.g., in physical storage resident in the corresponding business system $102_n$) and data store 110 of FIG. 1 (e.g., in physical storage resident in the SNSP system 106). Thus, data model 500 includes data from both business system data store 406 and data store 110.

Data store 406 comprises storage medium $510_1, \ldots, 510_n$. Data store 110 comprises storage medium $512_1, \ldots, 512_n$. Each storage medium $510_1, \ldots, 510_n, 512_1, \ldots, 512_n$ includes, but is not limited to, any type of physical storage medium known in the art. For example, each storage medium $510_1, \ldots, 510_n, 512_1, \ldots, 512_n$ may include, but is not limited to, volatile storage, non-volatile storage, magnetic storage (e.g., tape drive, hard disk), and/or optical storage (e.g., CD-ROM and DVD-ROM).

Conceptual layer 504 comprises relations $514_1, \ldots, 514_n$ within data store 406 and relations $516_1, \ldots, 516_n$ within data store 110. Each relation $514_1, \ldots, 514_n, 516_1, \ldots, 516_n$ may correspond to a table within a Relational Database Management System ("RDBMS") as is known in the art. It should be understood that conceptual layer 504 may further encompass additional data stores located within other business systems $102_2 \ldots 102_n$ in addition to data store 406 within business system $102_1$.

Logical layer 506 comprises views $508_1, \ldots, 508_n$. Each view can correspond to a view within an RDBMS. In an exemplary embodiment, each view may include data from any combination of the relations $514_1, \ldots, 514_n$ within data store 406 and/or relations $516_1, \ldots, 516_n$ within data store 110.

It should be noted that each business system $102_1, 102_2 \ldots 102_n$ may have a unique and independent data store 406. The logical layer 506 is configured to span a plurality of different data stores 406 in different business systems $102_1, 102_2 \ldots 102_n$. For example, business system $102_1$ associated with a first entity may comprise a first data store 406, and business system $102_2$ associated with a second entity may comprise a separate and distinct second data store 406. Logical layer 506 and views $508_1, \ldots, 508_n$ therein may be based on information in underlying data stores 406 of the business systems $102_1, 102_2$.

Figure 6A:
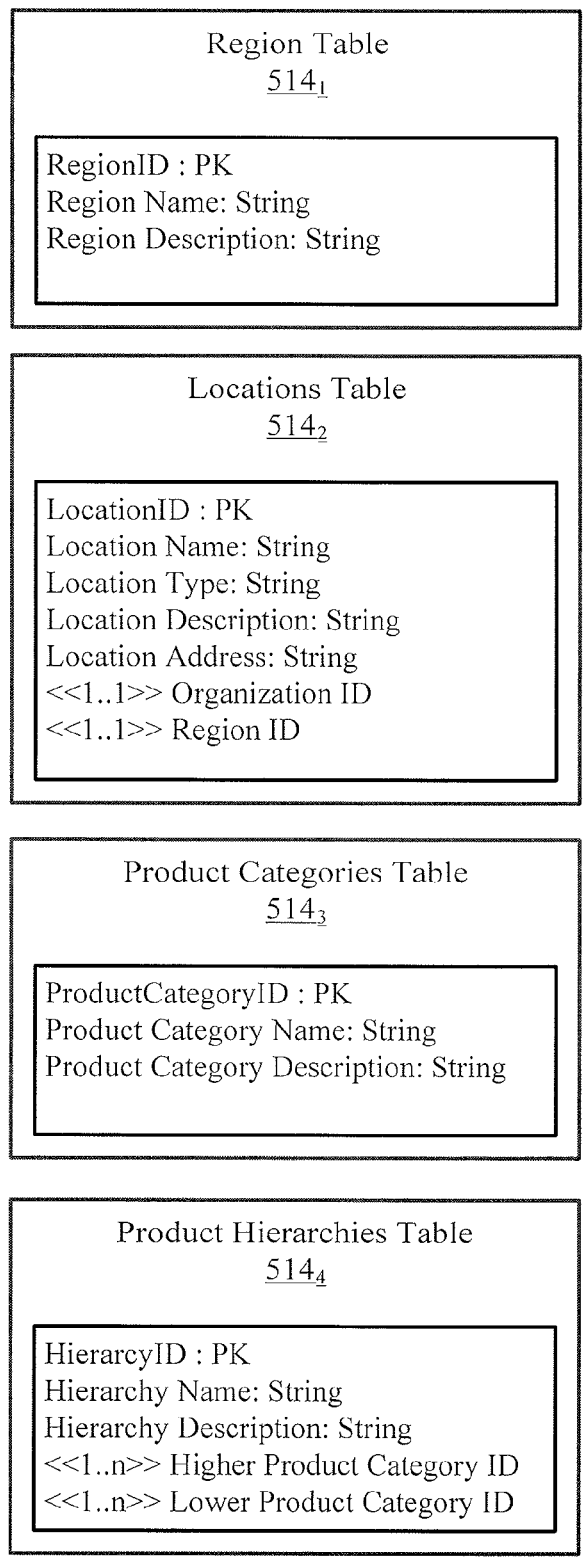

Referring now to FIGS. 6A-6B, a schematic illustration of exemplary embodiments of relations $514_1, \ldots, 514_n$ within data store 406 of FIG. 5 is provided. As noted above, each relation $514_1, \ldots, 514_n$ may comprise, but is not limited to, a table within an RDBMS. As such, each relation $514_1, \ldots, 514_n$ will be described as a table within an RDBMS, but it will be understood that other implementations are possible.

As shown in FIG. 6A, relation $514_1$ comprises a regions table. The regions table is provided for storing information about geographic regions (e.g., "U.S. South East" and/or "U.S. North West"). Such information includes, but is not limited to, a region identifier, a region name, and a region description.

Relation $514_2$ comprises a locations table. The locations table is provided for storing information about locations at which inventory can be located. Such information includes, but is not limited to, a location identifier, a location name, a location type, a location description, a location address, an organization identifier, and a region identifier. Each location is associated with exactly one organization and is located within exactly one geographic region. The location type includes, but is not limited to, a retail store, a warehouse, and/or a distribution center. The locations may further include information relating to product category restrictions (not shown). For example, the locations table could include information specifying that a store in West Palm Beach, Fla. is not authorized to carry and/or sell flammable products. Embodiments of the present invention are not limited to the particularities of this example.

Relation $514_3$ comprises a product categories table. The product categories table is provided for storing information about product categories (e.g., power tools and/or cordless tools). Such information includes, but is not limited to, a product category identifier, product category name, and product category description. Each product may be associated with one or more product categories as described below with reference to relation $514_5$.

Relation $514_4$ comprises a product hierarchies table. The product hierarchies table is provided for storing a hierarchy of product categories. Such information includes, but is not limited to, a hierarchy identifier, a hierarchy name, a hierarchy description, a higher product category identifier and a lower product category identifier. Each product category identifier identifies a product category in relation $514_3$. Each product category may contain sub-categories. For example, a product category comprises a tools category. The tools category has a plurality of sub-categories associated therewith. Such sub-categories include a power tools sub-category and a cordless tools sub-category. In turn, the power tools sub-category has a plurality of sub-categories associated therewith. The sub-categories include a power sanders sub-category and a power saws sub-category. Embodiments of the present invention are not limited to the particularities of this example.

Relation $514_5$ comprises a products table. The products table is provided for storing information about products. Such information includes, but is not limited to, a product identifier, a product name, a product description, a product category identifier, and a manufacturer identifier. Each product may be associated with one or more product categories in relation $514_3$. Each product may also be associated with one or more manufacturers specified in an organizations table (e.g., organizations table of relation $516_2$ of FIG. 7A).

Relation $514_6$ comprises an inventory locations table. The inventory locations table is provided for storing information about the locations of inventory. Such information includes, but is not limited to, a product identifier, a location identifier, a total quantity, a quantity sold, and a quantity available. The location identifier indentifies a location within the locations table. The total quantity information includes, but is not limited to, an integer indicative of a quantity of a product physically present at a location. The quantity sold information includes, but is not limited to, an integer indicative of the quantity of a product at a location that has already been designated as "sold". The quantity available information includes, but is not limited to, an integer indicative of the quantity of a product that is available for purchase. The integer value of the quality available information may be determined by subtracting the quantity sold of a product from the integer value of the total quantity information).

Relation $514_7$ comprises a purchase orders table. The purchase orders table is provided for storing information about a purchase order. Such information includes, but is not limited to, a purchase order identifier, a buyer organization identifier, a seller organization identifier, a product identifier, a quantity, and a unit price. Each of the organization identifiers identifies an organization specified in an organizations table (e.g., an organizations table of relation $516_2$ of FIG. 7A).

An exemplary purchase order 2900 is shown in FIG. 29. Any or all of the data shown in FIG. 29 may be stored in relation $514_7$. In the exemplary embodiment of FIG. 6B, each purchase order corresponds to one buyer organization, one seller organization, and one product. However, embodiments of the present invention are not limited in this regard. For example, a purchase order may include an order for a plurality of products and different prices.

It should be noted again that each business system $102_1$, $102_2 \ldots 102_n$ may have a unique and independent data store 406. Each data store 406 may have a unique schema. Each business system $102_1, 102_2 \ldots 102_n$ may comprise a separate and distinct set of relations $514_1, \ldots, 514_n$. For example, business system $102_1$ may have a first data store $406_1$ having a different set of relations 514 than a second data store $406_2$ in business system $102_2$.

Figure 7A:
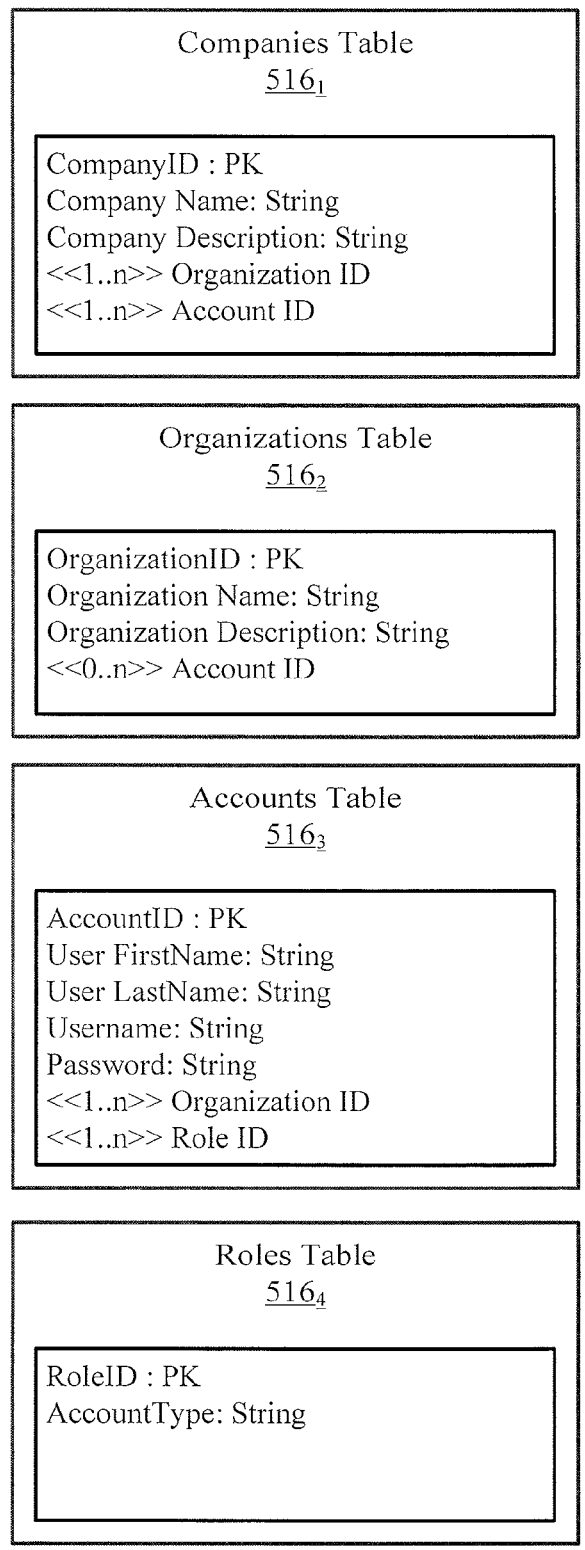

Referring now to FIGS. 7A-7B, a schematic illustration of exemplary embodiments of relations $516_1, \ldots, 516_n$ within data store 110 of FIG. 5 is provided. As noted above, each relation $516_1, \ldots, 516_n$ may comprise, but is not limited, a table within an RDBMS. As such, each relation $516_1, \ldots, 516_n$ will be described as a table within an RDBMS, but it will be understood that other implementations are possible.

As shown in FIG. 7A, relation $516_1$ comprises a companies table. The companies table is provided for storing information about companies. Such information includes, but is not limited to, a company identifier, a company name, a description, at least one organization identifier, and at least one account identifier. The organization identifier identifies an organization that is specified in a relation $516_2$. The account identifier identifies an account that is specified in relation $516_3$.

Relation $516_2$ comprises an organizations table. The organizations table is provided for storing information about organizations. Such information includes, but is not limited to, an organization identifier, an organization name, an organization description, and at least one account identifier. A business entity may access the social network using a plurality of organizations. For example, a company may be divided into a plurality of departments for administrative purposes. Each department is responsible for managing certain employees and a portion of a company's inventory. As such, each department is associated with an organization identified in relation $516_2$ and each organization is associated with the company in companies table $516_1$. Each organization manages respective user accounts. The user accounts are identified in relation $516_3$.

Relation $516_3$ comprises an accounts table. The accounts table is provided for storing information about user accounts. Such information includes, but is not limited to, an account identifier, a first name of a user, a last name of the user, a username for facilitating login, a password for facilitating login, at least one organization identifier, and at least one role identifier. The organization identifier identifies an organization that is specified in relation $516_2$. The role identifier identifies a role that is specified in relation $516_4$.

Relation $516_4$ comprises a roles table. The roles table is provided for storing information about user roles. Such information includes, but is not limited to, a role identifier and an account type. A plurality of users can be assigned to a role for easier management. For example, access permissions may be set by a role instead of by listing individual user accounts. Each role corresponds to a type of account, such as a buyer account, a seller account, or an administrator account. Account type defines an account's privileges within B2B social network system. For example, a buyer account type defines an account's privilege which allows a user to perform tasks necessary to purchase goods. Such tasks include, but are not limited to, creating purchase orders and viewing predetermined inventory information. An administrator account type defined an account's privilege in which a user is allowed to perform tasks relating to the administration of a B2B social network. Such tasks include, but are not limited to, editing organization information, defining users for an organization, defining permissions for each user, creating new business relationships, and setting parameters for business relationships.

Referring now to FIG. 7B, relation $516_5$ comprises a relationships table. The relationships table is provided for storing information about relationships between organizations. Such information includes, but is not limited to, a relationship identifier, a source organization identifier, a target organization identifier, and at least one inventory access rule identifier. The organization identifier identifies an organization specified in relation $516_2$. The inventory access rule identifier identifies an access rule specified in relation $516_6$.

Relation $516_6$ comprises an access rules table. The access rules table is provided for storing permissions for access to inventory data. Such information includes, but is not limited to, an access rule identifier, a role identifier, a region identifier, a location identifier, a product category identifier, and a product identifier. Relation $516_6$ is used when determining whether a user (or user account) has permission to access requested data.

Relation $516_7$ comprises a views table. The views table is provided for storing information about views. Such information includes, but is not limited to, a view identifier, at least one account identifier, at least one inventory access rule identifier, and at least one query. The query comprises a query for use with data store 406 and/or data store 110.

Relation $516_8$ comprises a transactions table. The transactions table is provided for storing historical transaction information. Such information includes, but is not limited to, a transaction identifier, a transaction type, at least one product identifier, at least one account identifier, and at least one organization identifier.

As evident from the above discussion, the system 100 implements one or more method embodiments of the present invention. The method embodiments of the present invention provide implementing systems with certain advantages over conventional data analysis systems. For example, the present invention provides a more efficient, complete, and user-friendly data analysis solution as compared to that of conventional inventory management systems. The present invention also provide a less time consuming and costly inventory data analysis process as compared to that of the conventional inventory management systems. The manner in which the above listed advantages of the present invention are achieved will become more evident as the discussion progresses.

Exemplary Methods of the Present Invention

Figure 8A:
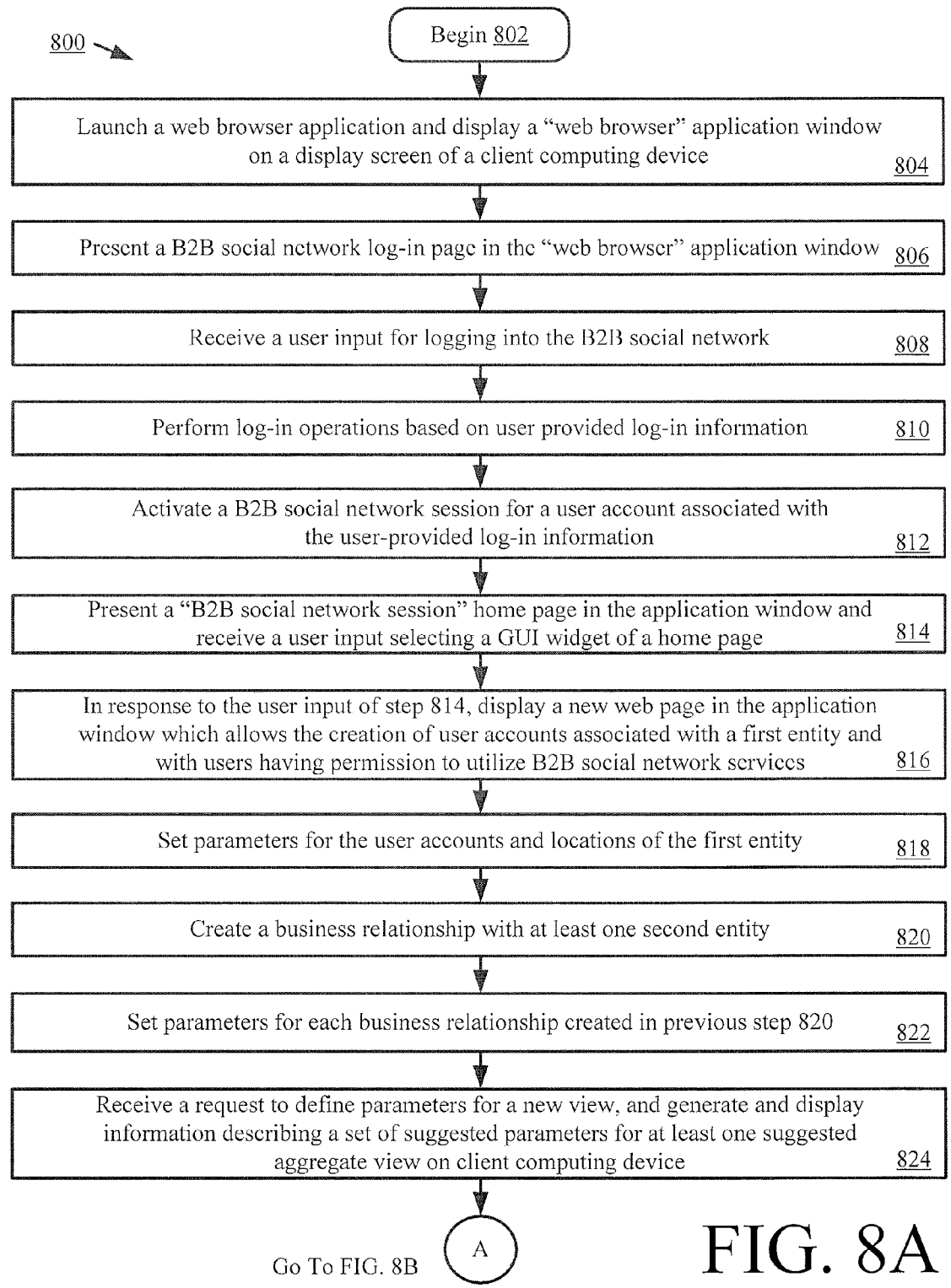
FIGS. 8A-8D collectively provide a flow diagram of an exemplary method for providing a B2B social network that is useful for understanding the present invention.

Referring now to FIGS. 8A-8D, there is provided a flow diagram of an exemplary method 800 for providing a B2B social network. As shown in FIG. 8A, the method 800 begins with step 802 and continues with step 804. Step 804 involves launching a web browser software application installed an a client computing device (e.g., computing device $402_1$, $402_2$, . . . , $402_n$ of FIG. 4). The web browser software application can be launched in response to a user software interaction. For example, as shown in FIG. 9, a web browser software application can be launched by accessing and selecting a web browser application entry 906 on a start menu 904 of a desktop window 902.

Figure 10:
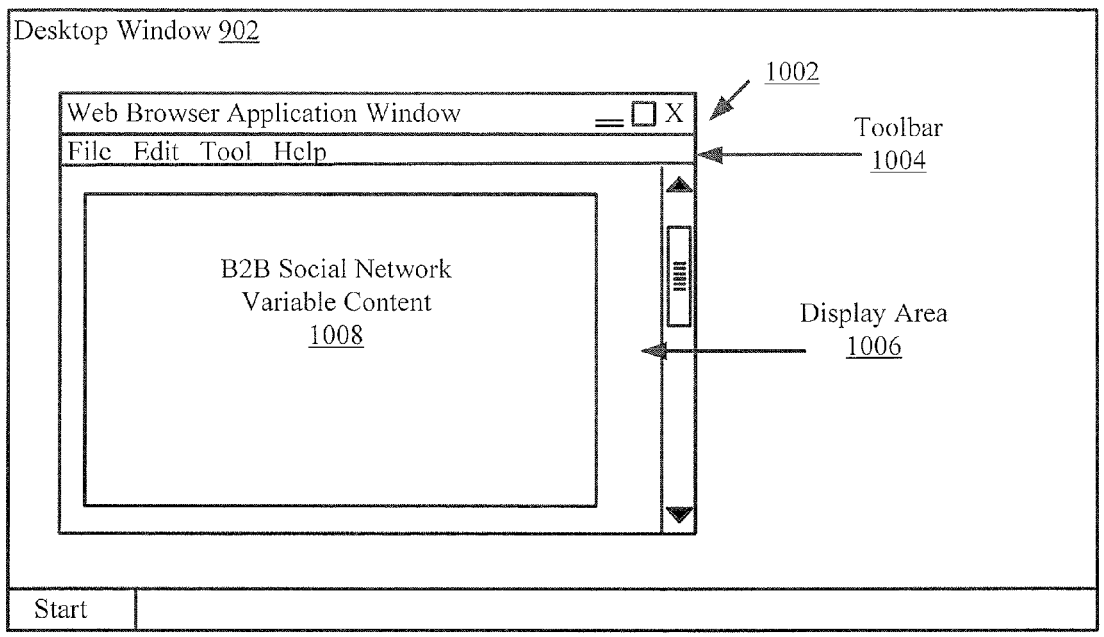
FIG. 10 is a schematic illustration of an exemplary web browser application window that is useful for understanding the present invention.

Step 804 also involves displaying a web browser application window on a display screen of the client computing device. A schematic illustration of an exemplary web browser application window 1002 is provided in FIG. 10. As shown in FIG. 10, the web browser application window 1002 includes a toolbar 1004 and a display area 1006 in which B2B social network variable content 1008 is presented.

Figure 11:
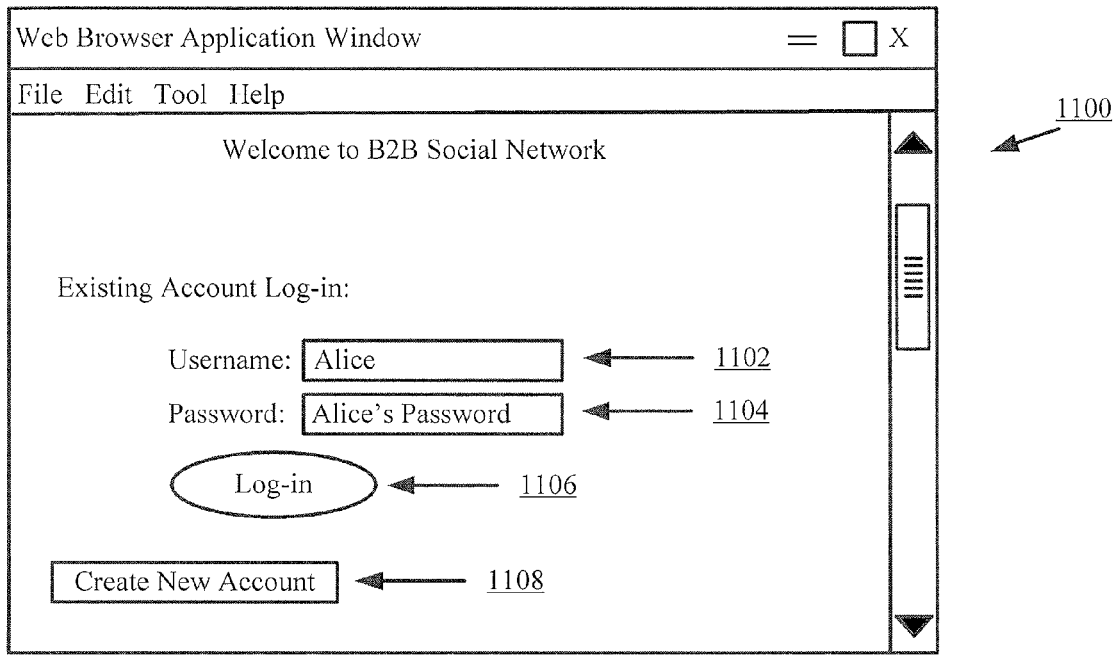
FIG. 11 is a schematic illustration of an exemplary account log-in web page of a B2B social network website that is useful for understanding the present invention.

After completing step 804, step 806 is performed where the web browser software application establishes a connection with an SNSP system (e.g., SNSP system 106 of FIG. 1) for purposes of obtaining content to be displayed in the web browser application window. The content obtained in step 806 includes a login page for a B2B social network. A schematic illustration of an exemplary login page 1100 is provided in FIG. 11. As shown in FIG. 11, the login page 1100 includes GUI widgets for logging into a B2B social network. The login page 1100 also includes a GUI widget for creating a new social networking account.

In a next step 808, the client computing device receives a user input for logging into a B2B social network. The user input comprises log-in information. The log-in information comprises, but is not limited to, a username, a password, and/or biometric information. Thereafter, step 810 is performed where log-in operations are performed based on the log-in information. The log-in operations of step 810 are performed by the client computing device and the SNSP system. Log-in operations are well known in the art, and therefore will not be described herein. Any known log-in operations can be used with the present invention without limitation.

Once a log-in is successful, the method 800 continues with step 812. In step 812, the SNSP system activates a B2B social network session for the user account associated with the log-in information. Methods for activating a social network session are well known in the art, and therefore will not be described herein. Any of the known methods for activating a social network session may be used with the present invention without limitation.

In a next step 814, a "B2B social network session" home page is presented in the web browser application window. The "B2B social network session" home page may be user-customizable such that the home page content depends on the active user account. Step 814 also involves receiving a user input selected at least one GUI widget of the home page.

Figure 12:
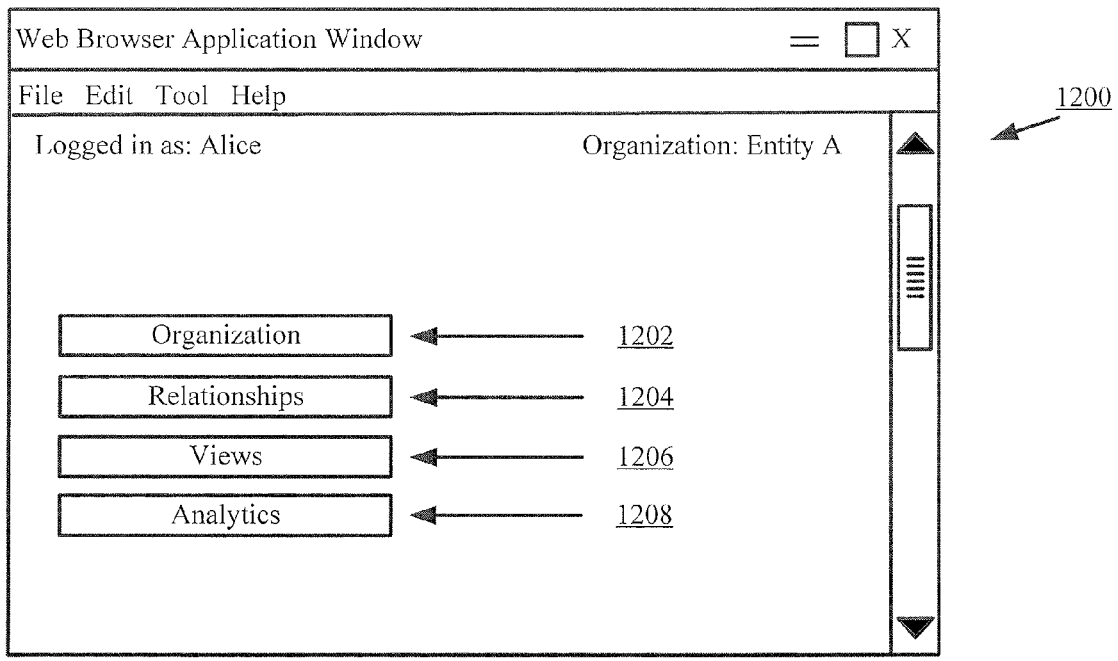
FIG. 12 is a schematic illustration of an exemplary home web page of a B2B social network website that is useful for understanding the present invention.

A schematic illustration of an exemplary "B2B social network session" home page 1200 is shown in FIG. 12. As shown in FIG. 12, the home page 1200 comprises a plurality of GUI widgets for facilitating the use of various services provided by a B2B social networking web site. The GUI widgets include, but are not limited to, buttons. For example, a button 1202 is provided for enabling a user to view information related to at least one organization and/or modify said information. A button 1204 is provided for enabling a user to view information related to business relationships, modify said information, create new business relationships, and/or terminate an established business relationship. A button 1206 is provided for enabling a user to specify information to be included within aggregate views, to initiate the generation of an aggregate view, a view information contained in an aggregate view, and/or modify the information contained in an aggregate view. A button 1208 is provided for enabling a user to view analytics information and/or modifying said analytics information. Embodiments of the present invention are not limited to the particularities of the home page shown in FIG. 12. More or less GUI widgets can be provided on the home page. Also, other types of GUI widgets can be employed for providing B2B social network services to users thereof.

Figure 13:
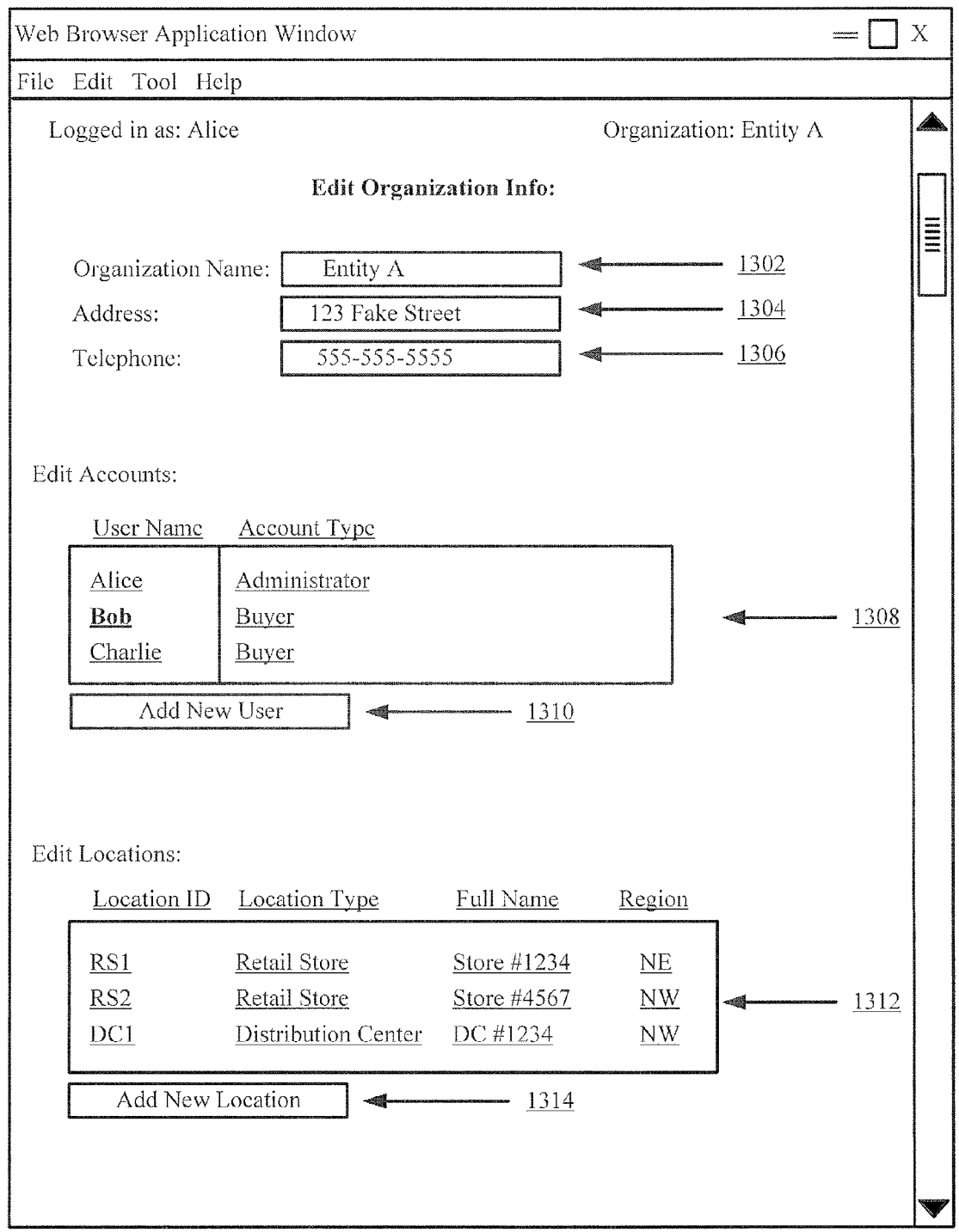
FIG. 13 is a schematic illustration of an exemplary organization management web page of a B2B social network website that is useful for understanding the present invention.

Referring again to FIG. 8A, the method 800 continues with step 816. In step 816, a new web page is presented in the web browser application window. The web page comprises GUI widgets for allowing the management of user accounts. In this regard, the web page comprises at least one GUI widget which enables a user to create user accounts. Each user account is associated with a member of a first entity that has permission to utilize the B2B social network services. A schematic illustration of an exemplary web page 1300 configured to allow management of user accounts is provided in FIG. 13. As shown in FIG. 13, new user accounts can be created using GUI widgets 1308 and 1310 of web page 1300.

In a next step 818, the user sets parameters for user accounts. The user account parameters can be set by using one or more GUI widgets of an account web page. The account web page is presented to the user in response to the selection of a user name (e.g., Bob) contained in a "user name" list of a currently presented web page (e.g., web page 1300 of FIG. 13). At least one of the GUI widgets of the user account web page is configured for authorizing a user of the associated user account to conduct a pre-specified level of activity in the system on behalf of the organization. The pre-specified level of activity includes, but is not limited to, viewing inventory data of a particular facility location and/or viewing data for a plurality of facilities in a given region (e.g., the South East).

Figure 14:
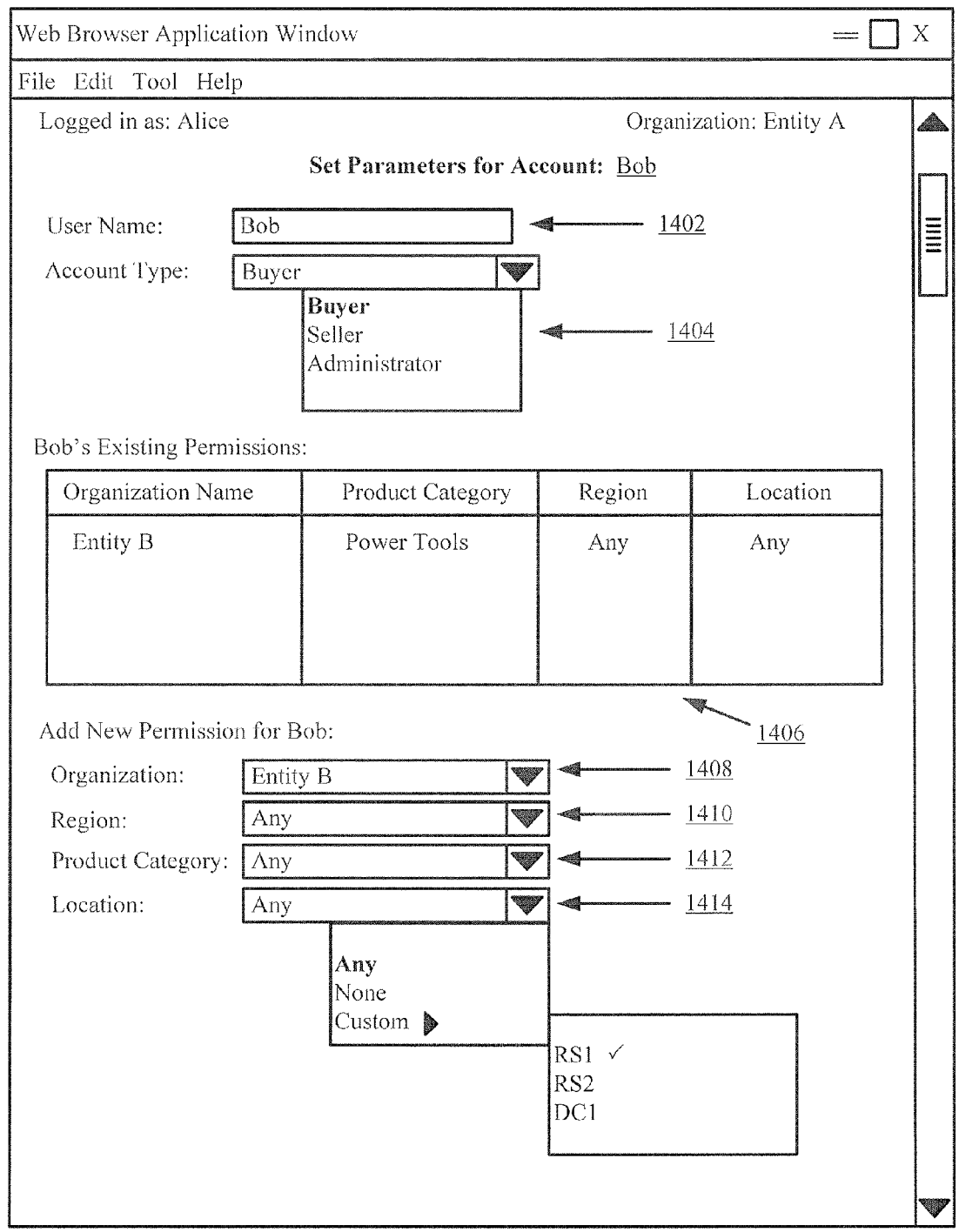
FIG. 14 is a schematic illustration of an exemplary account management web page of a B2B social network website that is useful for understanding the present invention.

A schematic illustration of an exemplary user account web page is provided in FIG. 14. As shown in FIG. 14, the account web page 1400 comprises text and a plurality of GUI widgets. The GUI widgets include a user name text box 1402, an account type combo box 1404, an existing permissions table 1406, an organization drop-down list 1408, a region drop-down list 1410, product category drop-down list 1412, and a location drop-down list 1414. The combo box 1404 allows a user to specify the type of account to be associated with a particular user (e.g., Bob). The table 1406 includes information associated with existing permissions for a particular user (e.g., Bob). Such information includes, but is not limited to, a list of organizations names identifying organizations comprising inventory data that can be viewed by a user, a list of product categories identifying categories of products having associated inventory data that can be viewed by the user, a list of regions identifying regions in which facilities of the organization reside, and a list of locations identifying geographic locations in which individual facilities reside. The drop-down list 1408 comprises selectable optional for all organization with which an entity has business relationships. The location drop-down list 1414 comprises selectable options for all locations associated with an entity and/or selectable options for all locations associated with organizations which have business relationships with the entity.

In the exemplary embodiment of FIG. 14, Alice sets the parameters for Bob's account such that Bob's account type "buyer" and Bob has access to inventory data for Entity B for products in the product category "power tools" for any region and for any location. It should be noted that the phrase "any region" and "any location" does not necessarily mean any region and/or location in the entire system 100. Rather, "any" in this context may mean that Bob is given access to all inventory information available to Entity A without regard to region. Bob's permissions may still be limited to only the information available to Bob's organization, i.e. "Entity A."

Referring again to FIG. 8A, step 818 also involves setting parameters for locations of facilities associated with the first entity. The facility location parameters can be set by using one or more GUI widgets of a locations web page. For example, an administrator may edit location information (e.g., locations associated with the active organization) using a web page similar to web page 1400. In an exemplary embodiment, an administrator can set product category restrictions for each location as described above.

In step 820, the user creates a new business relationship between the first entity and at least one second entity. The business relationship may be created by: searching a database for a second entity in response to at least one user-software interaction; selecting a second entity from a plurality of second entities identified in a list presented in a displayed business relationship web page; generating a message inviting the second entity to join the social network of the first entity; sending the message to the second entity; receiving a message indicating that the second entity desires to be part of the social network of the first entity; and creating a new record in relation (e.g., relation $516_5$ of FIG. 7B).

Figure 15:
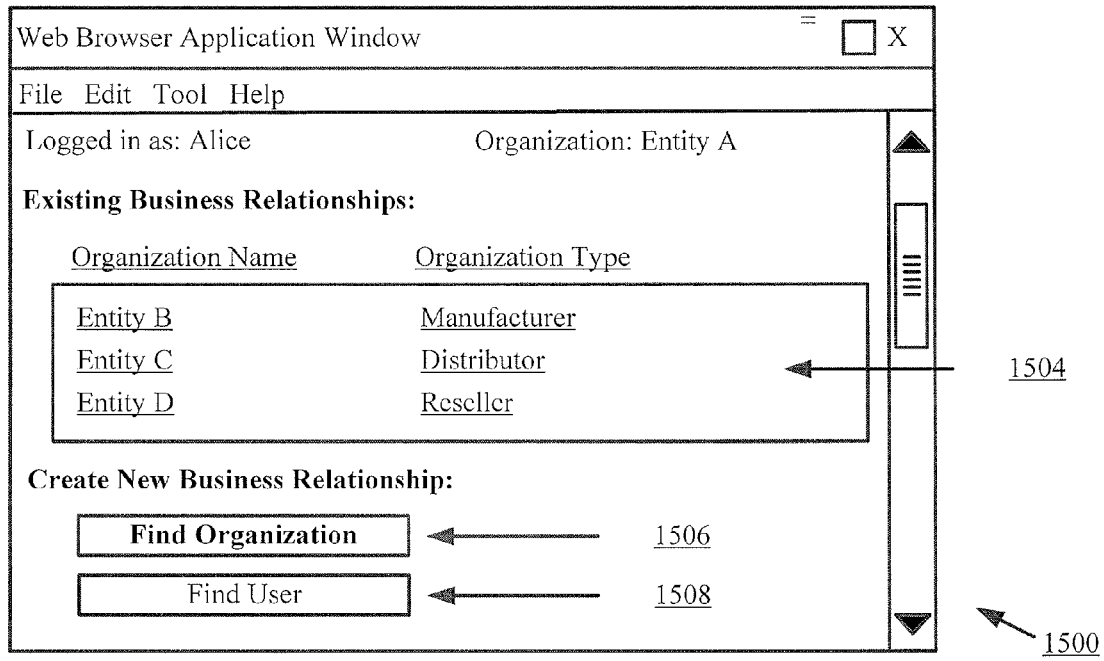
FIG. 15 is a schematic illustration of an exemplary relationship management web page of a B2B social network website that is useful for understanding the present invention.

A schematic illustration of an exemplary web page 1500 for managing business relationships for an organization is provided in FIG. 15. As shown in FIG. 15, the web page 1500 includes an existing business relationships section 1504, and GUI widgets for facilitating the creation of a new business relationship. The GUI widgets include, but are not limited to, a plurality of buttons 1506, 1508. In response to a mouse click on the button 1506, a web page is presented in the web browser application window which allows a user to search for a business entity to which a business relationship should be established.

Figure 16:
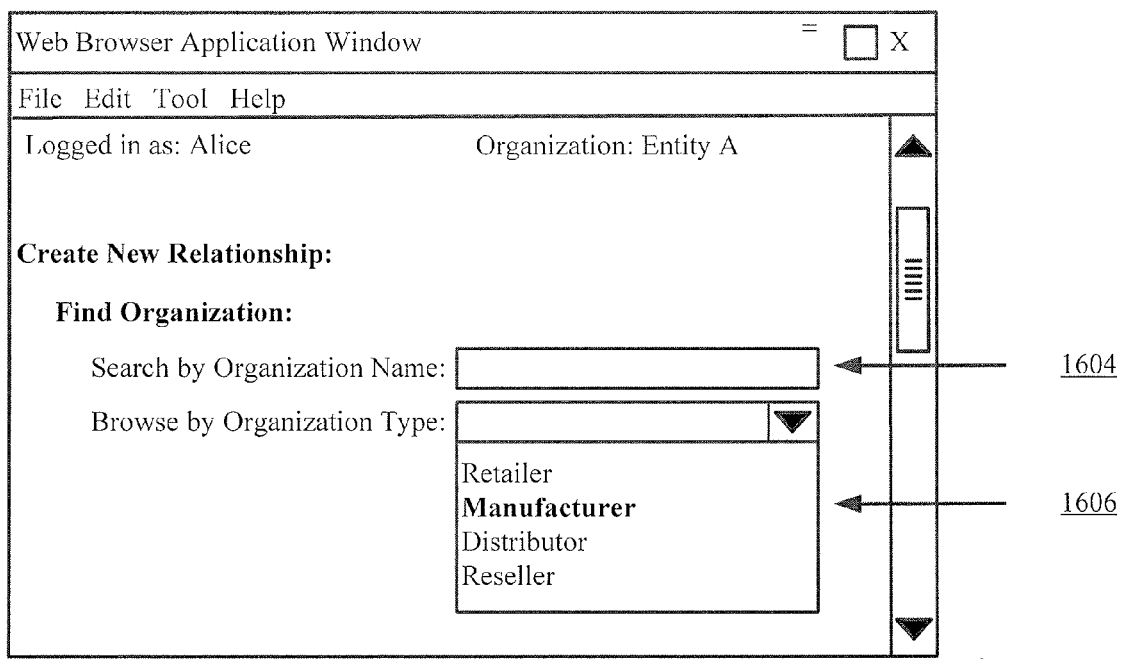
FIGS. 16-18 each provide a schematic illustration of an exemplary web page for creating a new relationship in a B2B social network that is useful for understanding the present invention.

A schematic illustration of an exemplary web page 1600 for searching for a business entity is provided in FIG. 16. As shown in FIG. 16, the web page 1600 includes a text box 1604 for receiving an organization name search string. The web page 1600 also includes a drop down menu 1606 which includes a plurality of selectable options identifying various types of organization.

Figure 17:
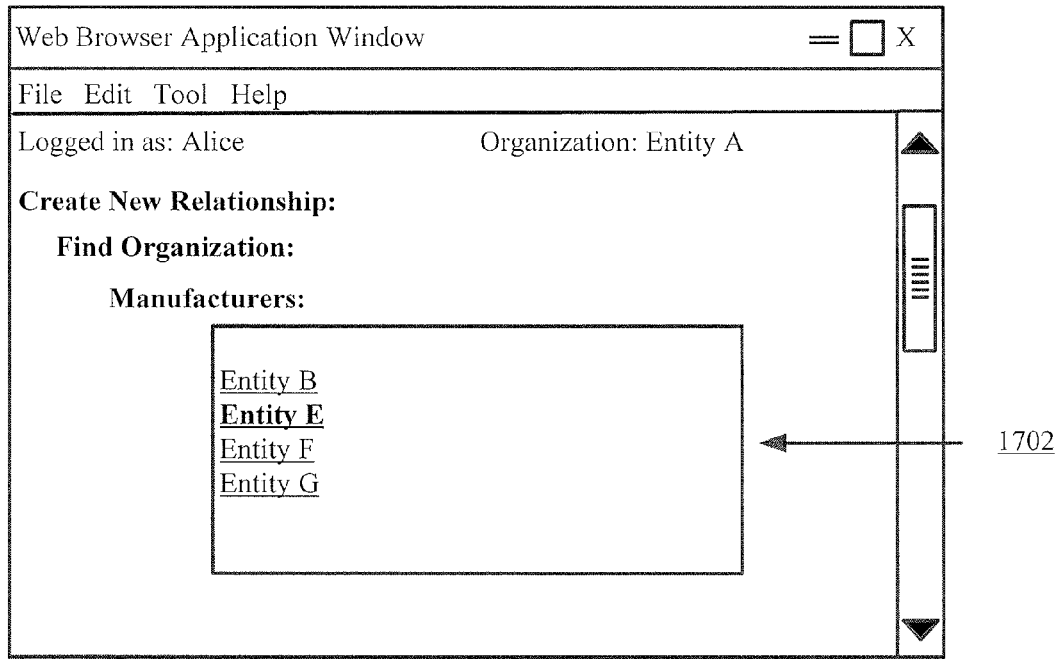

A schematic illustration of an exemplary web page 1700 displaying the results of a business entity search is provided in FIG. 17. As shown in FIG. 17, the web page 1700 comprises a list box 1702 that allows a user to select one or more items from a list contained within a multiple line text box. The items contained in the list include words and/or phrases identifying one or more business organizations that have names similar to or the same as the name entered in text box 1604 of FIG. 16 and/or that are of the same type as the organization type selected from the drop down menu 1606 of FIG. 6. In some embodiments of the present invention, the list presented in list box 1702 is filtered based on one or more business rules. For example, some entities may set organizational privacy options such that the organization will only appear in search results for other entities meeting certain criteria (e.g., a manufacturer is only interested in being contacted by retail store operators).

Figure 18:
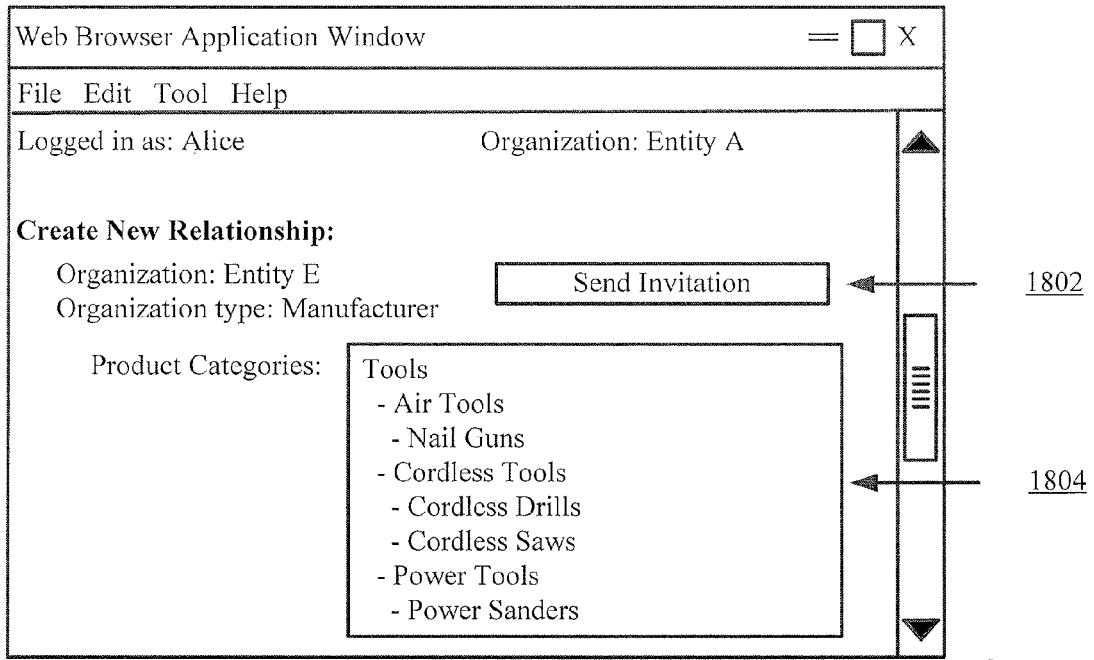

A schematic illustration of an exemplary web page 1800 for sending an invitation to an organization selected from the list 1702 is provided in FIG. 18. As shown in FIG. 18, the web page 1800 comprises a button 1802 for sending an electronic invitation to at least one pre-defined member of a user-selected organization (e.g., Entity E). The electronic invitation can be in an electronic mail format. For example, an e-mail message is sent to an administrator of Entity E. In this scenario, the e-mail message comprises a notice that Entity A has been requested to create a business relationship with Entity E. The e-mail message also includes a means for accepting and/or denying the invitation request. Such means includes, but is not limited to, a Uniform Resource Locator ("URL") referencing a web page in which a user may accept or deny the invitation request.

If the invitation is accepted by a member of the user-selected organization (e.g., Entity E), then a new business relationship is formed between the two entities (e.g., Entity A and Entity E). The new business relationship may be implemented as a new record created in a relation (e.g., relation $516_5$ of FIG. 7B). Once the business relationship is created, the name of the second entity (e.g., Entity E) to which the business relationship was established is automatically added to section 1504 of FIG. 15.

Referring again to FIG. 8A, the method 800 continues with step 822. In step 802, the user sets parameters for each business relationship created in previous step 820. The parameters include, but are not limited to, a data type parameter which identifies the inventory data that users of the respective second entity are permitted to access. The user-set parameters are stored in at least one relation (e.g., relation $516_5$ and/or relation $516_6$) of a data store of the SNSP system (e.g., data store 110 of FIG. 1). Notably, steps 816-822 of FIG. 8A may be available only to administrative user account types for the first entity.

Figure 19:
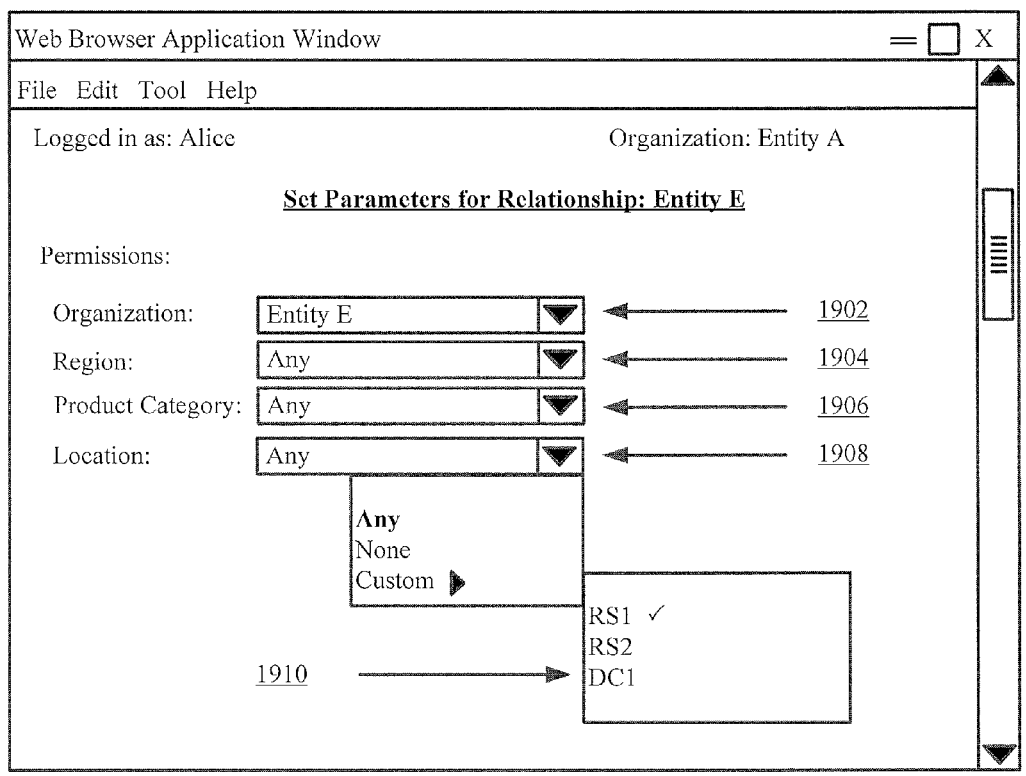
FIG. 19 is a schematic illustration of an exemplary web page for setting parameters for a relationship of a B2B social network that is useful for understanding the present invention.

A schematic illustration of an exemplary web page 1900 for setting parameters for a business relationship is provided in FIG. 19. As shown in FIG. 19, the web page 1900 comprises at least one GUI widget for facilitating the setting of parameters for a new business relationship and/or an existing business relationship. For example, web page 1900 allows a first entity (e.g., Entity A) to provide a second entity (e.g., Entity E) with permission to access select inventory data thereof. The inventory data can be restricted by organization, region, product category, and/or location. In this scenario, the GUI widgets of the web page 1900 include a combo box 1902 for selecting an organization from a list of organizations, a combo box 1904 for selecting a region from a list of regions, a combo box 1906 for selecting a product category from a list of product categories, and a combo box 1908 for selecting a location from a plurality of locations.

As shown in FIG. 19, combo boxes 1904-1908 include an "any" list item. Selection of the "any" list item of combo box 1904 means that members of the second entity (e.g., Entity E) will be able to view first entity's (e.g., Entity A's) inventory data for products supplied by the second entity to the first entity and which reside in facilities of the first entity located in any region. Selection of the "any" list item of combo box 1906 means that members of the second entity will be able to view first entities inventory data for products supplied by the second entity to the first entity and which are of any product category. Selection of the "any" list item of combo box 1908 means that members of the second entity will be able to view first entities inventory data for products supplied by the second entity to the first entity and which reside in any facility of the first entity.

As also shown in FIG. 19, the combo box 1908 has a "custom" list item. The "custom" list item has a plurality of sub-items 1910. Each of the sub-items 1910 allows a user (e.g., Alice) to limit members of the second entity (e.g., Entity E) to only viewing data associated with inventory supplied by the second entity that resides in a facility of the first entity located at a particular geographic location specified by a selected sub-item (e.g., "RS1").

Embodiments of the present invention are not limited to the particularities of FIG. 19. For example, users may additionally or alternatively be able to set inventory access permissions at a user account level, such that particular users within a partner organization are given access to inventory data. A web page for setting parameters for individual user-level access to inventory data could be similar to web page 1900.

Referring again to FIG. 8A, the method 800 continues with step 824 upon the completion of step 822. In step 824, the client computing device receives a user request to utilize services for defining parameters for a new aggregate view of inventory data. The user request can be facilitated using GUI widgets of at least one B2B social network web page. For example, the user can request utilization of services for defining parameters for an aggregate view by selecting a "Views" button 1206 of home page 1200 of FIG. 12, followed by the selection of a "Set Parameters" button of an aggregate view web page (not shown). Embodiments of the present invention are not limited in this regard.

In response to the user request, the client computing device automatically generates and sends a message to the SNSP system. The message includes information indicating that a user has requested utilization of services for defining parameters of a new aggregate view. As a result of the reception of said message by the SNSP system, it performs operations to generate at least one set of suggested parameters for the new aggregate view. The set of suggested parameters can be generated based on at least one user account, at least one business relationship associated with the user account, and/or transaction history associated with the user account. The transaction history may be stored in a relation (e.g., relation $516_3$ of FIG. 7A) of the data store of the SNSP system (e.g., data store 110 of FIG. 1). The transaction history includes, but is not limited to, a plurality of historical purchases initiated by a user associated with a particular user account. Thereafter, the SNSP system communicates the set of suggested parameters to the client computing device. At the client computing device, the set of suggested parameters are presented to the user via the web browser application window.

Figure 8B:
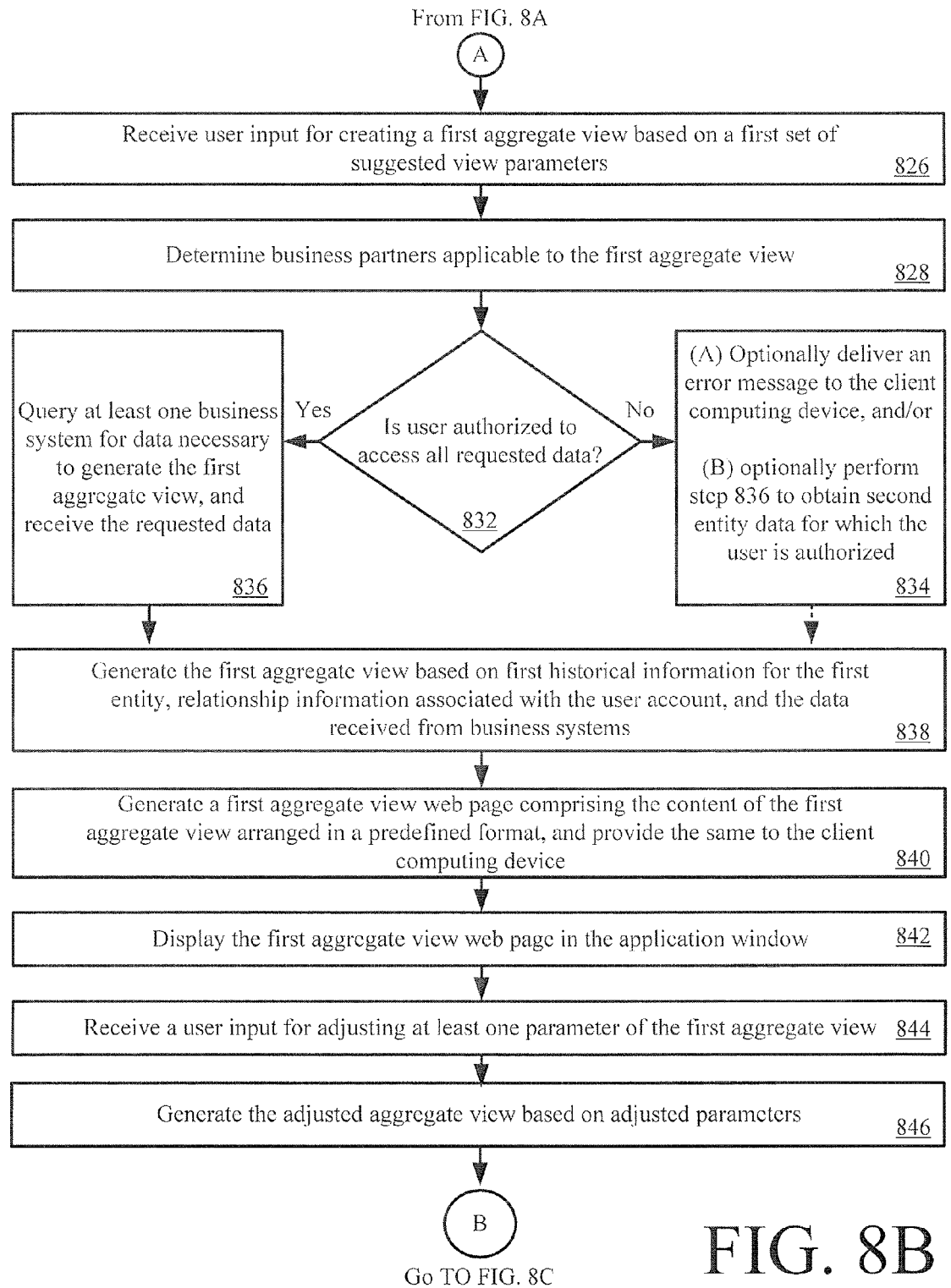
Figure 9:
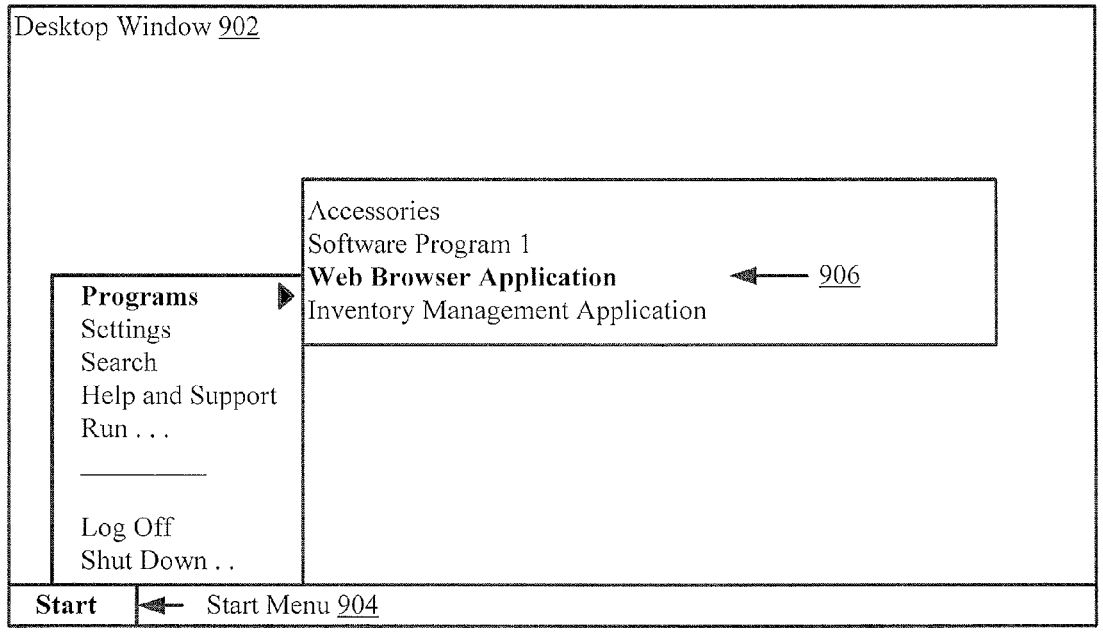
FIG. 9 is a schematic illustration of an exemplary desktop window that is useful for understanding the present invention.

Upon completing step 824, the method 800 continues with step 826 of FIG. 8B. As shown in FIG. 8B, step 826 involves receiving a user input for creating a first aggregate view based on a first set of suggested parameters. The user input can be facilitated by one or more GUI widgets of a "create new view" web page.

Figures 20, 21:
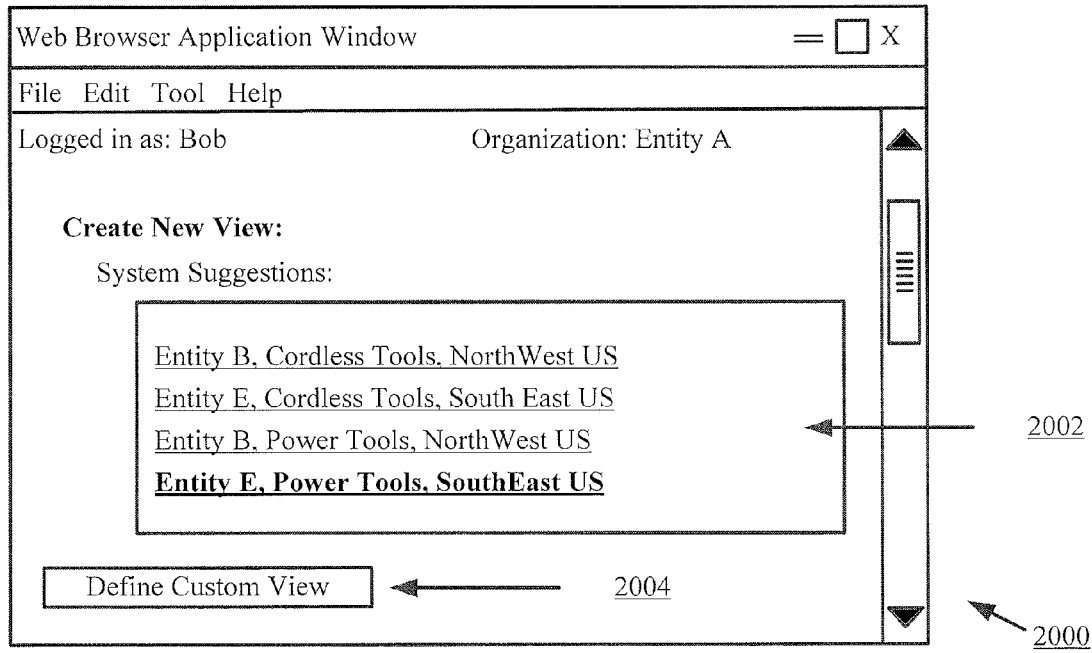
FIG. 20 is a schematic illustration of an exemplary web page for creating a new aggregate view that is useful for understanding the present invention.
FIG. 21 is a schematic illustration of an exemplary aggregate view that is useful for understanding the present invention.

A schematic illustration of an exemplary "create new view" web page 2000 is provided in FIG. 20. As shown in FIG. 20, the web page 2000 comprises a list box 2002 and a button 2004. The list box 2002 includes a plurality of list items specifying sets of suggested parameters for an aggregate view that is to be generated. Each list item is selectable by a user of the client computing device. The selected list item can be annotated by bolding the text thereof. Embodiments of the present invention are not limited in this regard. Any type of mark or annotation can be used to illustrate that a particular list item has been selected. By selecting an item from list box 2002, operations are initiated for creating an aggregate view based on the parameters specified by the selected item. These operations will become apparent as the discussion progresses.

Referring again to FIG. 8B, the method 800 continues with step 828 where operations are performed to determine the business partners applicable to the first aggregate view. Step 828 may involve generating a list of all organizations applicable to the first aggregate view based on an analysis of the parameters specified by the item selected from a list (e.g., list 2002 of FIG. 20) contained in the "create new view" web page. The list of applicable organizations is generated by the SNSP system. Upon completing step 828, the method 800 continues with a decision step 832. Decision step 832 is performed for purposes of determining whether a particular user is authorized to access all of the data associated with the parameters selected for the first aggregate view ("requested data"). The operations of step 832 are performed by the SNSP system. In this regard, the SNSP systems may perform operations for iteratively looping through each business partner in the list generated at previous step 828. The SNSP system may also perform operations for querying at least one table stored in a data store thereof to obtain data that is useful in determining whether a particular user is authorized to access certain data. For example, the SNSP system may query one or more relations (e.g., relation $516_5$ and/or relation $516_6$ of FIG. 7B) stored in a data store thereof (e.g., data store 110 of FIG. 1). Thereafter, the SNSP system uses the information obtained from it's data store to make a determination as to whether a user is authorized to access certain data.

If the user is authorized to access all of the requested data [832:YES], then the method 800 continues with step 836. Step 836 generally involves performing operations by the SNSP system and a gateway (e.g., gateway 408 of FIG. 4) for querying at least one business system (e.g., business system $102_1, 102_2, \ldots, 102_n$ of FIG. 1) for inventory data that is necessary to generate the first aggregate view. The query operations can include, but are not limited to, the following operations: generating, by the SNSP system, a query message for reading certain inventory data from a data store of at least one business system (e.g., data store 406 of FIG. 4); communicating the query message from the SNSP system to the gateway of the business system; process the query message at the gateway for purposes of placing the query message in a form that is supported by inventory management software of the business system (e.g., software 450 of FIG. 4); communicating the query message from the gateway to a server of the business system (e.g., server 404 of FIG. 4); process the query message at the server; perform operations by the server to read inventory data from the data store of the business system; and communicate the inventory data retrieved from the data store from the server to the gateway; generate a message including the inventory data and that is in a form suitable for communications over a network (e.g., network 104 of FIG. 1) to the SNSP system; and communicate the message from the gateway to the SNSP system. Step 836 also involves using the inventory data to generate an aggregate view at the SNSP system. After completing step 836, step 838 is performed. Step 838 will be described below.

If the user is not authorized to access all of the requested data [832:NO], then the method 800 continues with an optional step 834. Step 834 involves optionally delivering an error message to the client computing device indicating that an error occurred and the user lacks the necessary access privileges for viewing data to be contained in the first aggregate view. Step 834 may alternatively or additionally involve optionally performing step 836 to obtain second entity data for which the user is authorized. In this scenario, the SNSP system continues with operations for generating the first aggregate view without some of the requested data. For example, the SNSP system may simply generate the first aggregate view with certain fields left blank in which the user is not authorized to access data thereof. If step 836 is performed in step 834, then the method 800 continues with step 838.

Step 838 involves generating, by the SNSP system 106, the first aggregate view based on: (a) first historical information for the first entity; (b) business relationship information associated with the user account; and/or (c) the inventory data received thereat from the gateway of at least one business system (e.g., business system $102_1, 102_2, \ldots, 102_n$ of FIG. 1). If inventory data is received from more than one business system, then step 838 may involve arranging the received inventory data within the first aggregate view so that it can be presented to a user of the client computing device in a pre-defined format. Step 838 may alternatively or additionally involve combining at least a portion of the received inventory data in a pre-defined manner. For example, the SNSP system may calculate a sum of values defined by the inventory data received from multiple business systems. Embodiments of the present invention are not limited in this regard.

Subsequent to generating the first aggregate view, step 840 is performed where the SNSP system generates a first aggregate view web page. The first aggregate view web page comprises the content of the first aggregate view arranged in a predefined format (e.g., a table format). In step 840, the SNSP system also provides the aggregate view web page to the client computing device. At the client computing device the aggregate view web page is displayed in the web browser application window, as show by step 842.

Schematic illustrations of exemplary aggregate view web pages 2100, 2300 are provided in FIGS. 21 and 23. As shown in FIGS. 21 and 23, each web page 2100, 2300 comprises a table of information concerning inventory data of the second entity (e.g., Entity E). Notably, the content of the tables is based on two active filters, namely a "Region: SE" filter and a "Manufacturer: Entity E" filter. Consequently, the content of the tables is limited to the South East region and to products manufactured by an Entity E. Active filters operate to restrict the displayed data accordingly. Thus, adding filters can be considered a "roll-up" operation, and removing filters can be considered a "drill-down" operation, as is known in the art. Aside from the active filters, the content of the tables is only limited by the inventory data available to the first entity (e.g., Entity A).

As also shown in FIG. 21, the aggregate view web page 2100 further comprises a toolbar 2102. Toolbar 2102 will be described in detail in relation to FIGS. 22A-22D. Referring now to FIGS. 22A-22D, toolbar 2102 comprises a "view" drop down menu 2202, a "filters" drop down menu 2204, and a "sort" drop down menu 2206. The "view" drop down menu 2202 includes a list of commands. Specifically, drop down menu 2202 includes a "Save Current View As. ." command, an "Open" command, and a "Choose Columns. ." command. The "Save Current View As. ." command is a directive to a web browser software application and/or a B2B social network software application for saving the first aggregate view comprising the displayed content such that said content can be viewed again at a later time. The first aggregate view may be stored in a data store of the SNSP system (e.g., data store 110 of FIG. 1).

The "Open" command is a directive to a web browser software application for presenting a list of previously saved views. Saved views may be shared between users of the social network such that a view saved by a first user may later be opened by a second user. For example, an organization may configure associated user accounts such that all saved views are shared with all users of the organization.

The "Choose Columns. ." command is a directive to a web browser software application for presenting a list of items from which to choose. The list includes items specifying types of information that can be displayed in a table of an aggregate view web page (e.g., web page 2100 of FIG. 21). The types of information include, but are not limited to, region, location, product category, product name, manufacturer, available quantity, and total quantity. In response to a mouse click on one of the list items, the content of a table of an aggregate view web page is restricted to the type of information identified by the selected list item.

Figure 22A:
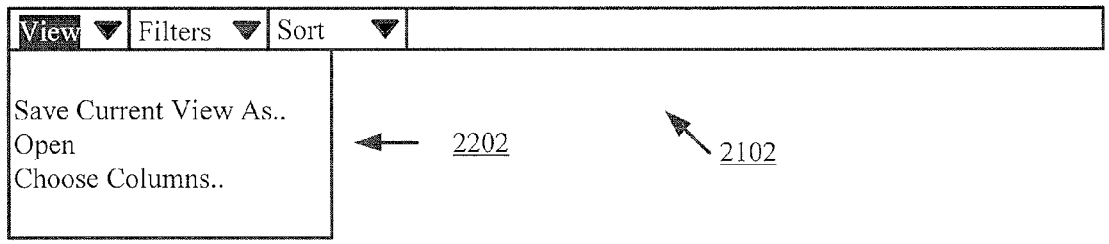
FIGS. 22A-22D each provide a schematic illustration of an exemplary Graphical User Interface ("GUI") widget for modifying an aggregate view that is useful for understanding the present invention.
Figure 22B:
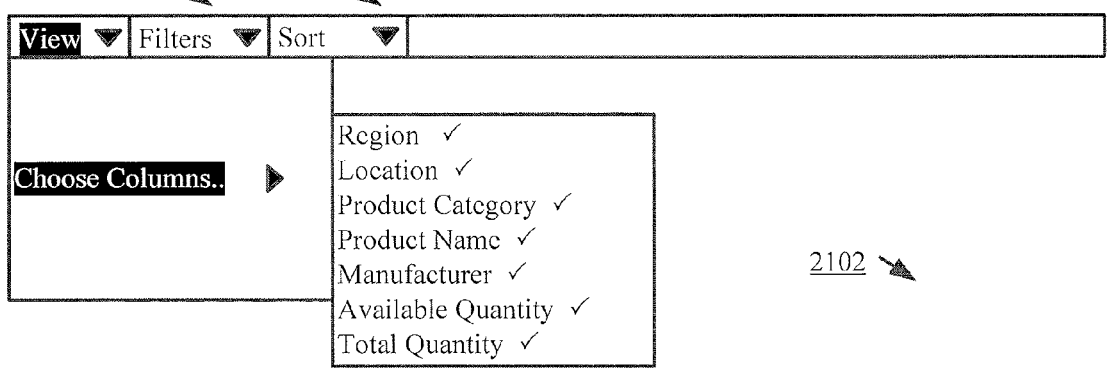
Figure 22C:
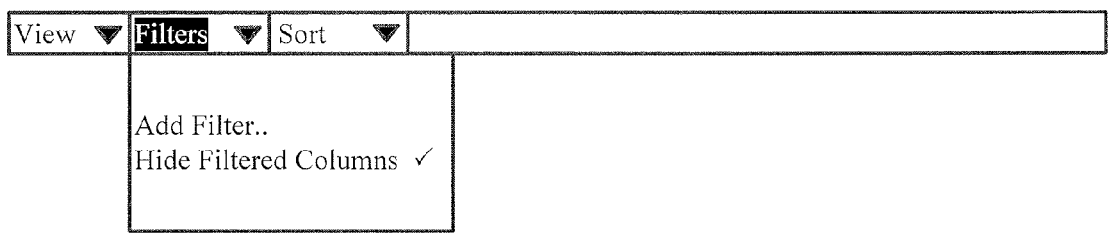

As shown in FIG. 22C, the "filters" drop down menu 2204 comprises an "Add Filter. ." command and a "Hide Filtered Columns" command. The "Add Filter. ." command is a directive to a web browser software application and/or a B2B social network software application for adding a new active filter. The "Hide Filtered Columns" command is a directive to a web browser software application and/or a B2B social network software application for hiding columns of a table that are the subject of an active filter. A schematic illustration of an exemplary table which has hidden columns is provided in FIG. 23. As shown in FIG. 23, the table is absent of a "region" column and a "manufacturer" column. These columns are considered hidden.

Figure 22D:
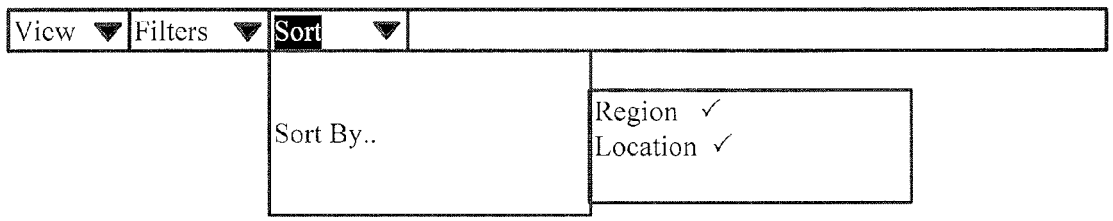
Figure 27:
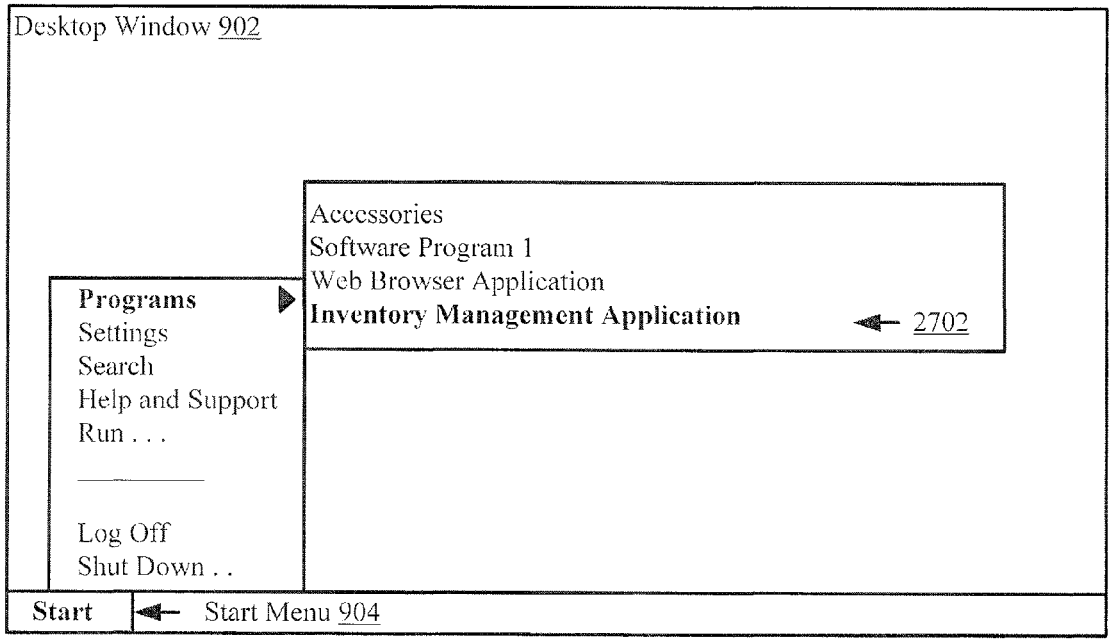
FIG. 27 is a schematic illustration of an exemplary desktop window that is useful for understanding the present invention.

As shown in FIG. 22D, the sort drop down menu 2206 comprises a "Sort By. ." command. The "Sort By. ." command is a directive to a web browser software application and/or a B2B social network software application for presenting a list of items by which an aggregate view can be sorted. The list items include, but are not limited to, a region item and a location item. In response to a mouse click on a list item, the content of a table of an aggregate view web page is sorted based on the particularities of the content thereof which is of the type specified by the selected list item. For example, if the "region" list item is selected, then all entries of the table will be sorted based on their associated region. In this scenario, the table entries associated with a South East region appear at the top rows of the table. The table entries associated with the North East region appear in the middle rows of the table. The table entries associated with the North West region appear in the bottom rows of the table. Embodiments of the present invention are not limited in this regard.

Referring again to FIG. 8B, the method 800 continues with step 844. In step 844, a user input is received by the client computing device for adjusting at least one parameter of the first aggregate view. The user input is facilitated by one or more GUI widgets of an aggregate view web page. For example, the user input is facilitated by one or more GUI widgets of the toolbar 2102 of FIGS. 22A-22D. Such GUI widgets can include, but are not limited to, a GUI widget for adding and/or removing an active filter. Embodiments of the present invention are not limited in this regard.

In response to the reception of the user input in step 844, step 846 is performed where an adjusted aggregate view is generated by the B2B social network system. In this regard, it should be understood that the client computing device generates and sends a message to the SNSP system indicting that it has received a user input for adjusting at least one parameter of the first aggregate view. Upon receipt of this message, the SNSP system performs operations to generate an adjusted aggregate view. The adjusted aggregate view is generated based on the first aggregate view data and/or inventory data of at least one second entity that is stored in the data store of the SNSP system. Alternatively, the adjusted aggregate view is generated by performing a second iteration of an aggregate view generation process (e.g., steps 828-842 of FIG. 8B) using the adjusted parameter(s). The decision as to whether or not to use the first aggregate view data and/or the inventory data of the second entity is based on the age of said data (i.e., whether the data is "stale" because its age exceeds a pre-set threshold).

Figure 8C:
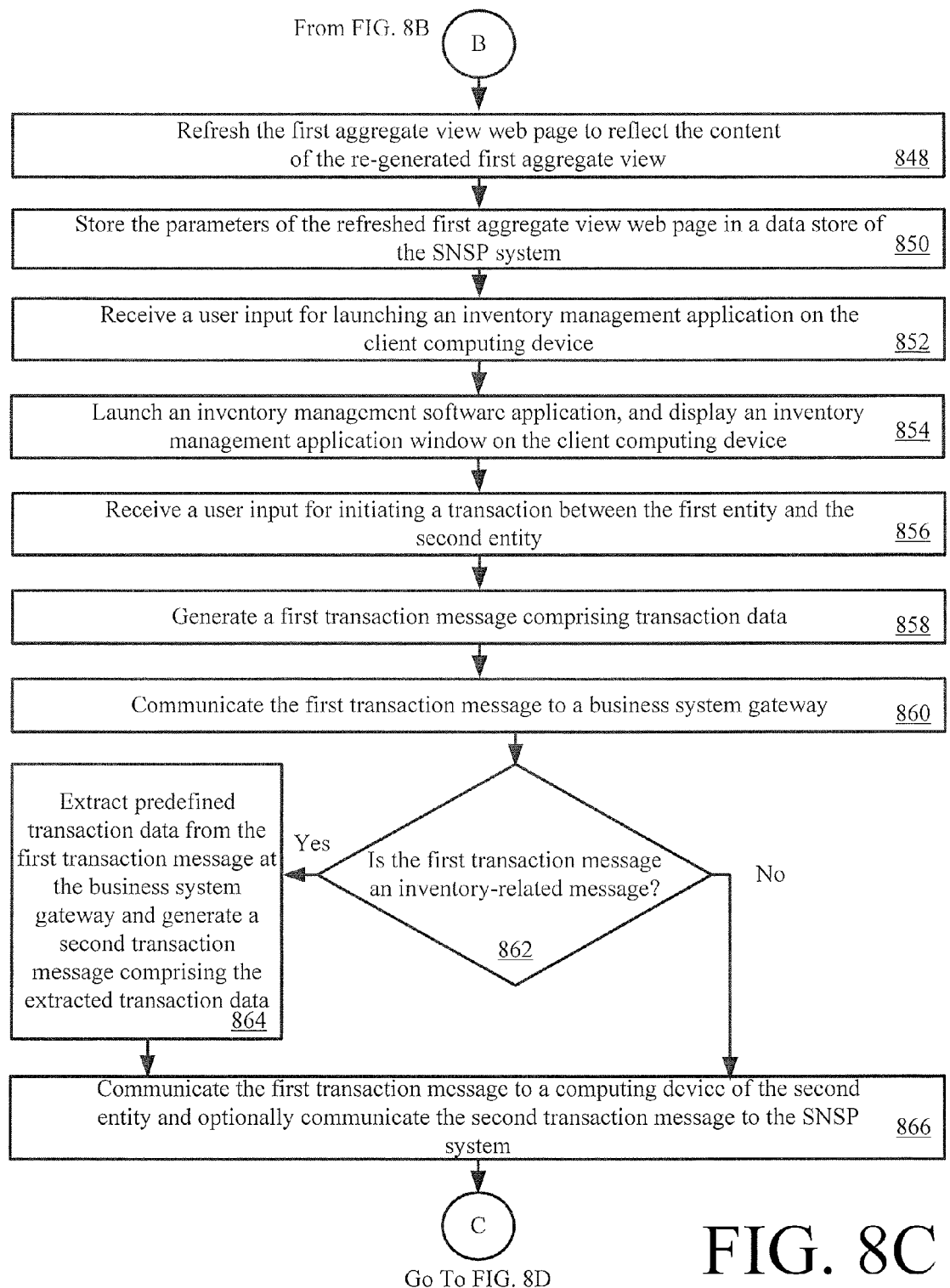

Upon completing step 846, the method 800 continues with step 848 of FIG. 8C. Referring now to FIG. 8C, step 848 involves refreshing the aggregate view web page such that it includes a table comprising the content of the adjusted aggregate view. A schematic illustration of an exemplary adjusted aggregate view web page 2400 is provided in FIG. 24.

As shown in FIG. 24, the aggregate view web page 2400 includes three active filters. The active filters include a "Region: SE" filter, a "Manufacturer: Entity E" filter, and a "Product: E123" filter. The "Product: E123" filter corresponds to a "drill-down" for the specific product "E123" manufactured by Entity E. Notably, aggregate view web page 2400 includes data associated with a plurality of locations (e.g., locations RS1, RS2 and DC1) for facilities operated by the first entity (e.g., Entity A) and data associated with at least one location (e.g., location E1) of a facility operated by the second entity (e.g., Entity E). In this example, the content of the table indicates that products E123 of the second entity (e.g., Entity E) resides in a facility located at location E1. The facility located at location E1 is operated by the second entity (e.g., Entity E). In this regard, it should be understood that the user of the first entity (e.g., Entity A) has permission to view inventory data of the second entity that is associated at least with Product E123 which resides in a facility of location E1. Embodiments of the present invention are not limited in this regard.

Another schematic illustration of an exemplary adjusted aggregate view web page 2500 is provided in FIG. 25. As shown in FIG. 25, the aggregate view web page 2500 includes two active filters. The active filters include a "Region: SE" filter and a "Product Category: Power Tools" filter. Consequently, the table of web page 2500 comprises information relating to aggregate quantities (both available and total quantities) for all power tools residing in facilities of the first entity (e.g., Entity A) and the second Entity (Entity E) located within the South East region of the United States ("U.S."). The table content of the web page 2500 can be considered "roll-up" content relative to the table content of web page 2400 of FIG. 24.

Another schematic illustration of an exemplary adjusted aggregate view web page 2600 is provided in FIG. 26. As shown in FIG. 26, the aggregate view web page 2600 includes three active filters. The active filters include a "Region: SE" filter, a "Location: RS1" filter, and a "Product Category: Tools" filter. Consequently, the view web page 2600 comprises a table including content relating to aggregate quantities (both available and total quantities) for all tools residing in a facility of the first entity (e.g., Entity A) that is located at location RS1. With respect to product category, the table content of web page 2600 can be considered "roll-up" content relative to the table content of web page 2500 of FIG. 25. With respect to location, the table content of web page 2600 can be considered "drill-down" content relative to the table content of web page 2500 of FIG. 25. Thus, it will be appreciated that both "roll-up" and "drill-down" operations may be performed simultaneously or concurrently when generating an adjusted aggregate view.

Referring again to FIG. 8B, the method 800 continues with step 850 in which the parameters for the refreshed first aggregate view web page are stored. These parameters can be stored in a data store (e.g., data store 110 of FIG. 1) of the SNSP system. Upon completing step 850, step 852 is performed.

In step 852, the client computing device receives a user input for launching an inventory management software application installed thereon. The user input is facilitated by one or more GUI widgets of a displayed web page. For example, the user input includes mouse clicking on an "Inventory Management Application" entry (e.g., entry 2702 of FIG. 27) of a start menu (e.g., start menu 904 of FIG. 27) of a desktop window (e.g., desktop window 902 of FIG. 27). Embodiments of the present invention are not limited in this regard.

The inventory management software application may be launched in response to a decision by the user that at least one product (e.g., a power tool) needs to be purchased from the second entity (e.g., Entity E). This decision can be made based on the user's review of the table content displayed in one or more aggregate view web pages (such as those described above in relation to FIGS. 24-26).

Figure 28:
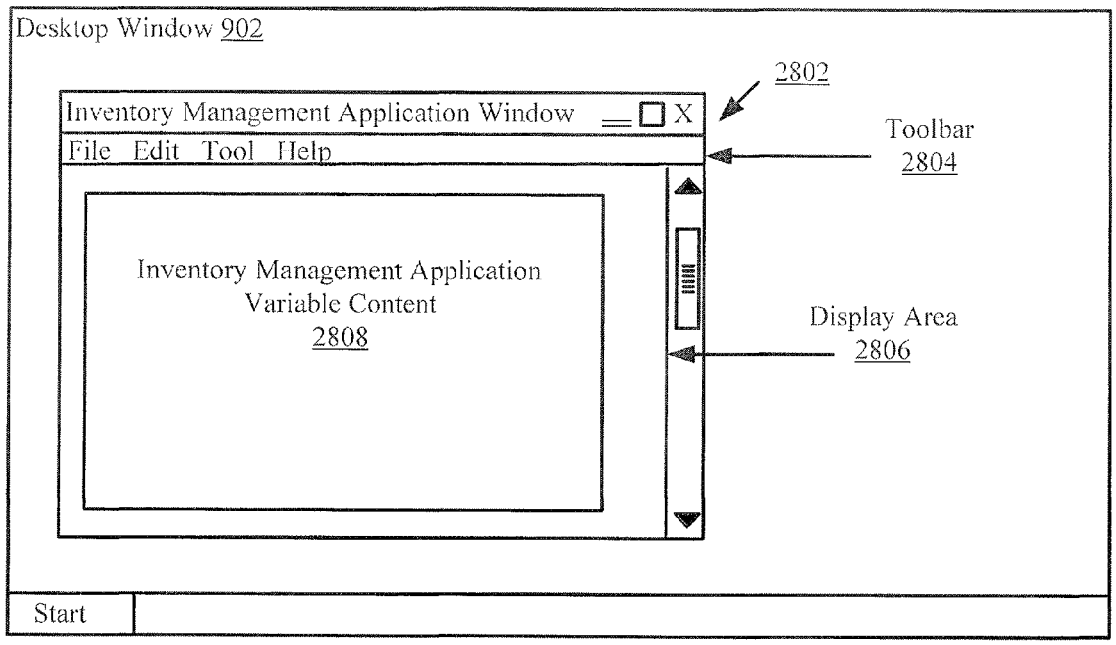
FIG. 28 is a schematic illustration of an exemplary inventory management application window that is useful for understanding the present invention.

In a next step 854, the inventory management software application is launched. Step 854 also involves displaying an inventory management application window on top of the desktop window of the client computing device. A schematic illustration of an exemplary inventory management application window 2802 is provided in FIG. 28. As shown in FIG. 28, the inventory management application window 2802 comprises a toolbar 2804 and display area 2806. The display area 2806 provides an area of the window 2802 that inventory management application variable content 2808 can be presented.

After completing step 854, step 856 is performed where the client computing device receives a user input for initiating a transaction between the first entity (e.g., Entity A) and the second entity (e.g., Entity B). The transaction includes, but is not limited to, a purchase order. The user input is facilitated by one or more GUI widgets of the inventory management application window (not shown in FIG. 28). The GUI widgets can include any type of GUI widget selected in accordance with a particular application. For example, the GUI widgets include combo boxes, menus, and/or buttons.

In response to the reception of the user input in step 856, step 858 is performed where the client computing device generates a first transaction message comprising information relating to the transaction. Such information includes, but is not limited to, purchase order information. The first transaction message may comprise, but is not limited to, an electronic mail message. Notably, a copy of the first transaction message may be stored in a data store (e.g., data store 406 of FIG. 4) of the respective business system (e.g., business system $102_1$, $102_2$, ..., or $102_n$ of FIG. 1). For example, if the first message corresponds to a purchase order, then it may be stored in relation $514_7$ of data store 406. Embodiments of the present invention are not limited in this regard.

In a next step 860, the first transaction message is communicated from the client computing device to a gateway (e.g., gateway 408 of FIG. 4) of the respective business system. At the gateway, the first transaction message is processed to determine is the first transaction message is of a particular type, such as an inventory-related message. The phrase "inventory-related message" refers to a message that affects the inventory of one or more entities. For example, an inventory-related message includes, but is not limited to a purchase order message.

If the first transaction message is not an inventory-related message [862:NO], then method 800 continues with step 866. Step 866 will be described below. In contrast, if the first transaction message is an inventory-related message [862: YES], then method 800 continues with step 864.

Step 864 involves extracting by the gateway pre-defined transaction data from the first transaction message. For example, the gateway may extract transaction data contained in the first transaction message relating to the product to be purchased, the quantity of the product, and/or the availability of the product. Step 864 also involves generating by the gateway a second transaction message comprising the extracted transaction data.

In a next step 866, the gateway communicates the first transaction message to an intended destination computing device of the second entity. If a second transaction message was generated by the gateway, then it will also communicate the second transaction message to the SNSP system, as shown by step 866.

A schematic illustration of an exemplary inventory-related message 2900 is provided in FIG. 29. As shown in FIG. 29, message 2900 comprises a purchase order initiated by a member of the first entity (e.g., Entity A). The purchase order is configured for placing an order with the second entity (e.g., Entity E) for one hundred and fifty ("150") units of a product E123 at a price of four dollars and fifteen cents ("$4.15"). The units are to be delivered to the first entity on Jan. 30, 2012 at a facility thereof that is associated with location RS1. Embodiments of the present invention are not limited in this regard. The inventory-related message can include any information selected in accordance with a particular application.

Figure 8D:
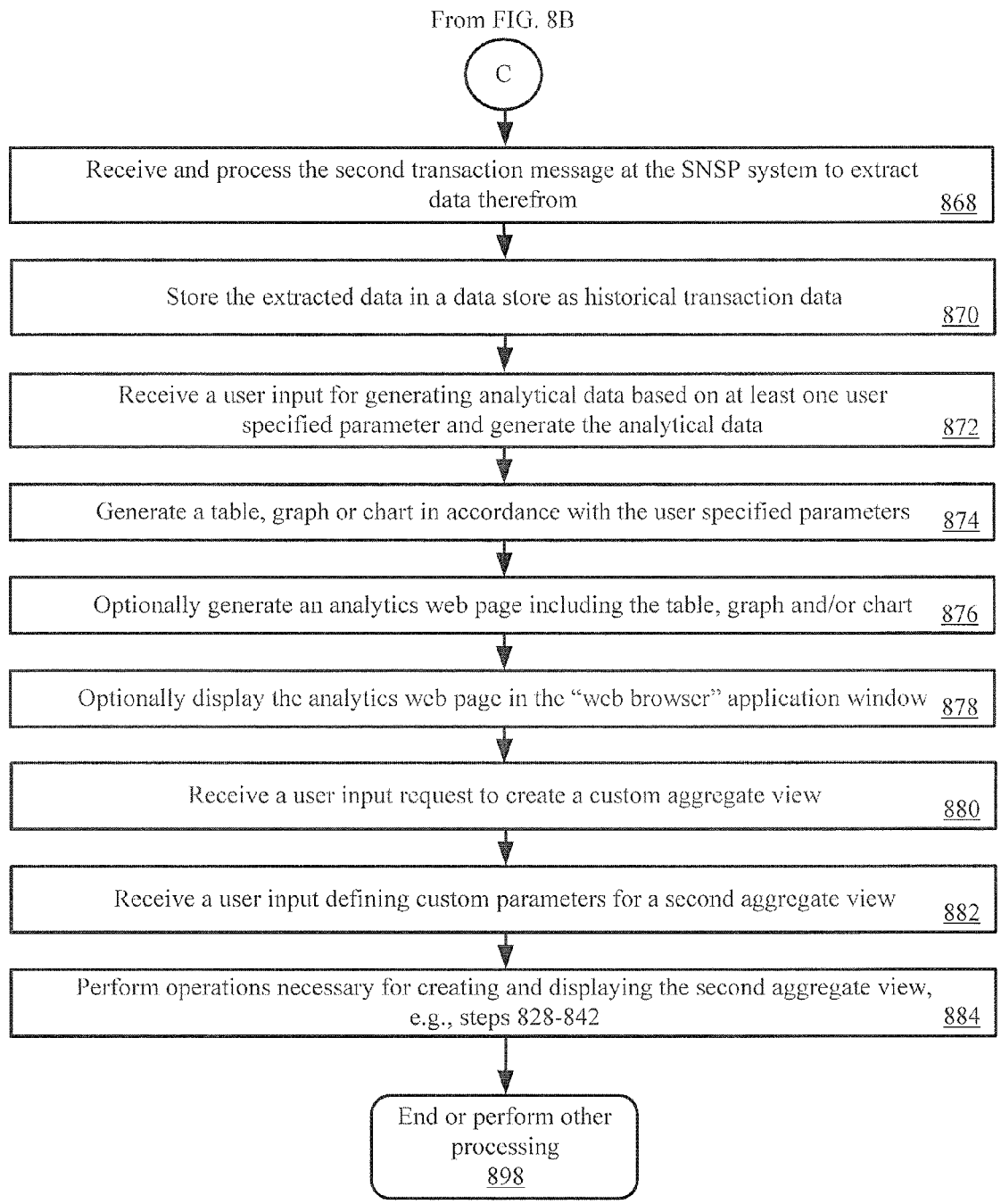

Referring again to FIG. 8C, the method 800 continues with step 868 of FIG. 8D. As shown in FIG. 8D, step 868 involves receiving the second transaction message at the SNSP system. Upon the receipt of the second transaction message, the SNSP system processes the same to extract the data thereof. Thereafter, the SNSP system stores the extracted data as historical transaction data in a data store (e.g., data store 110 of FIG. 1) thereof in association with the corresponding entities (e.g., Entities A and E) and the initiating user, as shown by step 870. In some embodiments of the present invention, step 870 may involve creating at least one new record and/or updating at least one existing record of relation $516_8$ of FIG. 7B.

After completing step 870, the method 800 continues with step 872 where a user input is received by the client computing device. The user input includes user-software interactions for generating analytical data based on at least one user specified parameter. The user-software interactions can be facilitated by one or more GUI widgets of a web page for a B2B social network. In response to the reception of the user input, the analytical data is generated, as shown by step 872. The analytical data can be generated by the client computing device and/or the SNSP system using data stored in a local data store (e.g., data store 406 of FIG. 4) and/or at least one remote data store (e.g., data store 110 of FIG. 1 and/or a data store of another business system). If the analytical data is generated by the SNSP system, then the client computing device must communicate a message to the SNSP system indicating that the user thereof has requested the generation of analytical data using one or more user specified parameters. Upon the reception of this message, the SNSP system generates the requisite analytical data.

The analytical data includes, but is not limited to, results of computational operations and/or comparison operations. For example, the analytical data includes data derived by comparing at least two average unit purchase prices for particular products manufactured by different second entities. Embodiments of the present invention are not limited in this regard. The analytical data includes any data selected in accordance with a particular application.

After completing step 872, step 874 is performed where a table, graph and/or chart is generated using the analytical data. The table, graph and/or chart can be generated by the client computing device or the SNSP system. Methods for generating tables, graphs and charts are well known in the art, and therefore will not be described herein. However, any such known method can be used with the present invention without limitation.

If the table, graph and/or chart is generated by the SNSP system, then optional step 876 is performed where the SNSP system generates an analytics web page including the generated table, graph and/or chart. The analytics web page is then displayed in a web browser application window of the client computing device, as shown by step 878.

Subsequent to the completion of step 878, steps 880-884 are performed. Step 880 involves receiving by the client computing device a user input to create a custom aggregate view. The user input can be facilitated by one or more GUI widgets of a web page for a B2B social network. For example, the user input is facilitated by a mouse click on a "Define Custom View" button 2004 of a web page 2000 of FIG. 20. Embodiments of the present invention are not limited in this regard. Notably, a "custom view creation" web page is presented in the web browser application window in response to the user input of step 880. A schematic illustration of an exemplary "custom view creation" web page 3000 is provided in FIG. 30. As shown in FIG. 30, the web page 300 includes a plurality of GUI widgets 3002-3008 for customizing parameters of an aggregate view that is to be subsequently generated.

In a next step 882, the client computing device receives a user input defining custom parameters for an aggregate view that is to be generated. This user input of step 882 is facilitated using one or more GUI widgets of a web page of a B2B social network. For example, the user input is facilitated by one or more GUI widget 3002-3008 of FIG. 30. Although the GUI widget 3002-3008 are shown in FIG. 30 to comprise drop down menus, embodiments of the present invention are not limited in this regard. The GUI widgets 3002-3008 can be of any type selected in accordance with a particular application.

In response to the user inputs of previous steps 880 and 882, various operations for generating a custom aggregate view and displaying a web page comprising the content of the custom aggregate view to a user of the client computing device. The custom aggregate view is generated by the SNSP system. Similarly, the web page is created by the SNSP system. As such, the web page is communicated from the SNSP system to the client computing device for presentation to a user thereof. Step 884 may also involve performing the operations of previous steps 828-842 of FIG. 8B using the custom parameters. Upon completing step 884, step 898 is performed where the method 800 ends and/or other processing is performed.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As evident from the above discussion exemplary embodiments of the present invention relate to Cloud Computing, SaaS and IaaS. As such, the present invention was described above in relation to cloud computing. Although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The characteristics of cloud computing include: on-demand self-services; broad network access capabilities; resource pooling capabilities; rapid elasticity capabilities; and measured services. With on-demand self-services, a cloud consumer can unilaterally provision computing capabilities, such as server time and network storage, as needed automatically without requiring human interaction with the service's provider. Broad network access capabilities are available over a network and accessed through standard mechanisms that promote use by heterogeneous thin or thick client platforms (e.g., mobile phones, laptops, and PDAs). Resource pooling capabilities provide a means to pool a provider's computing resources for serving multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured services provide cloud systems that can automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The service models for cloud computing include SaaS, Platform as a Service ("PaaS"), and IaaS. Each of these service models will be discussed separately below.

SaaS refers to a service model which facilitates use of a provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

PaaS refers to the service model which facilitates deployment onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

IaaS refers to the service model which facilitates the provision of processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models for cloud computing include a private cloud deployment model, a community cloud deployment mode; a public cloud deployment model, and a hybrid cloud deployment model. Each of the deployment models will be briefly discussed below for purposes of assisting a reader in understanding the present invention.

The private cloud deployment model comprises a cloud infrastructure that is operated solely for an organization. It may be managed by the organization or a third party and may exist on-premises or off-premises.

The community cloud deployment model comprises a cloud infrastructure that is shared by several organizations and supports a specific community that has shared concerns (e.g., mission, security requirements, policy, and compliance considerations). It may be managed by the organizations or a third party and may exist on-premises or off-premises.

The public cloud deployment model comprises a cloud infrastructure that is made available to the general public or a large industry group and is owned by an organization selling cloud services. The hybrid cloud deployment model comprises a cloud infrastructure that is a composition of two or more clouds (private, community, or public) that remain unique entities but are bound together by standardized or proprietary technology that enables data and application portability (e.g., cloud bursting for load-balancing between clouds).

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method for providing a Business-to-Business ("B2B") social network, comprising:
    creating, by at least one electronic circuit, a business relationship between a first commercial entity and at least one second commercial entity in the B2B social network, where the first and second commercial entities are disparate business entities employing non-compatible electronic inventory management systems;
    setting, by said electronic circuit, at least one parameter which indicates that at least one user of said first commercial entity is authorized to view inventory data of said second commercial entity;
    receiving, by said electronic circuit, a first request by said user of said first commercial entity to view first inventory data of said first commercial entity and second inventory data of said second commercial entity;
    determining, by the electronic circuit, whether said user is authorized to view said second inventory data based on said parameter;
    if it is determined that said user is authorized to view said second inventory data, then performing the following operations by said electronic circuit:
        querying a first remote inventory management system of said first commercial entity for said first inventory data and a second remote inventory management system of said second commercial entity for said second inventory data, where the first and second remote inventory management systems are not compatible with each other;
        receiving said first inventory data and said second inventory data;
        generating an aggregate view comprising said first and second inventory data; and
        providing content of said aggregate view to a client computing device of said first commercial entity.

2. The method according to claim 1, wherein said first inventory management system and said second inventory management system employ different protocols.

3. The method according to claim 1, wherein a query for said first inventory data or said second inventory data is converted from a first protocol format to a second different protocol format during said querying step.

4. The method according to claim 1, wherein said parameter further indicates that said user is authorized to view inventory data of said second commercial entity associated with inventory residing in a facility within at least one geographic location or geographic region.

5. The method according to claim 1, wherein said parameter further indicates that said user is authorized to view inventory data of said second commercial entity associated with products of at least one product category.

6. The method according to claim 1, wherein said aggregate view is further generated using historical transaction information for said first commercial entity or said second commercial entity which was generated by a respective one of said first remote inventory management system or said second remote inventory management system.

7. The method according to claim 1, further comprising:
    determining, by the electronic circuit, at least one set of inventory data of at least two different entities that should be suggested to a user of said client computing device for purposes of creating said aggregate view; and
    providing information identifying said set of inventory data to said client computing device.

8. The method according to claim 1, further comprising:
    receiving, by the electronic circuit, a first transaction message comprising inventory-related transaction data that was obtained from a second transaction message generated by said first or second remote inventory management system; and
    storing said inventory-related transaction data in a data store as historical transaction data that may be used in a subsequent aggregate view creation process.

9. The method according to claim 1, further comprising:
    receiving, by the electronic circuit, a second request from said client computing device for modifying said aggregate view based on at least one user-specified adjustment parameter;
    generating, by the electronic circuit, an adjusted aggregate view based on said user-specified adjustment parameter; and
    providing content of said adjusted aggregate view to said client computing device.

10. The method according to claim 1, further comprising generating analytical data in response to a reception of a second request for generating analytical data based on at least one of user-specified inventory data or user-specified historical transaction data.

11. The method according to claim 1, further comprising denying said first request if it is determined that said user is not authorized to view said second inventory data.

12. The method according to claim 1, further comprising performing an aggregate view creation process without said second inventory data if it is determined that said user is not authorized to view said second inventory data.

13. A system, comprising:
    at least one electronic circuit configured to:
        create a business relationship between a first commercial entity and at least one second commercial entity in a social network, where the first and second commercial entities are disparate business entities employing non-compatible electronic inventory management systems;
        set at least one parameter which indicates that at least one user of said first commercial entity is authorized to view inventory data of said second commercial entity;
        receive a first request by said user of said first commercial entity to view first inventory data of said first commercial entity and second inventory data of said second commercial entity;

determine whether said user is authorized to view said second inventory data based on said parameter;

perform the following operations if it is determined that said user is authorized to view said second inventory data:

querying a first remote inventory management system of said first commercial entity for said first inventory data and a second remote inventory management system of said second commercial entity for said second inventory data, where the first and second remote inventory management systems are not compatible with each other;

receiving said first inventory data and said second inventory data;

generating an aggregate view comprising said first and second inventory data; and providing content of said aggregate view to a client computing device of said first commercial entity.

14. The system according to claim 13, wherein said first inventory management system and said second inventory management system employ different protocols.

15. The system according to claim 13, wherein a query for said first inventory data or said second inventory data is converted from a first protocol format to a second different protocol format during said querying operations.

16. The system according to claim 13, wherein said parameter further indicates that said user is authorized to view inventory data of said second commercial entity associated with inventory residing in a facility within at least one geographic location or geographic region.

17. The system according to claim 13, wherein said parameter further indicates that said user is authorized to view inventory data of said second commercial entity associated with products of at least one product category.

18. The system according to claim 13, wherein said aggregate view is further generated using historical transaction information for said first commercial entity or said second commercial entity which was generated by a respective one of said first remote inventory management system or said second remote inventory management system.

19. The system according to claim 13, wherein said electronic circuit is further configured to:

determine at least one set of inventory data of at least two different entities that should be suggested to a user of said client computing device for purposes of creating said aggregate view; and provide information identifying said set of inventory data to said client computing device.

20. The system according to claim 13, wherein said electronic circuit is further configured to:

receive a first transaction message comprising inventory-related transaction data that was obtained from a second transaction message generated by said first or second remote inventory management system; and store said inventory-related transaction data in a data store as historical transaction data that may be used in a subsequent aggregate view creation process.

21. The system according to claim 13, wherein said electronic circuit is further configured to:

receive a second request from said client computing device for modifying said aggregate view based on at least one user-specified adjustment parameter;

generate an adjusted aggregate view based on said user-specified adjustment parameter; and provide content of said adjusted aggregate view to said client computing device.

22. The system according to claim 13, wherein said electronic circuit is further configured to generate analytical data in response to a reception of a second request for generating analytical data based on at least one of user-specified inventory data or user-specified historical transaction data.

23. The system according to claim 13, wherein said electronic circuit is further configured to deny said first request if it is determined that said user is not authorized to view said second inventory data.

24. The system according to claim 13, wherein said electronic circuit is further configured to perform an aggregate view creation process without said second inventory data if it is determined that said user is not authorized to view said second inventory data.

25. A device comprising a non-transitory computer-readable storage medium, having stored thereon a computer program for managing a social network, the computer program having a plurality of code sections, the code sections executable by a computing device to cause the computing device to perform the steps of:

creating a business relationship between a first commercial entity and at least one second commercial entity in the B2B social network, where the first and second commercial entities are disparate business entities employing non-compatible electronic inventory management systems;

setting at least one parameter which indicates that at least one user of said first commercial entity is authorized to view inventory data of said second commercial entity;

receiving a first request by said user of said first commercial entity to view first inventory data of said first commercial entity and second inventory data of said second commercial entity;

determining whether said user is authorized to view said second inventory data based on said parameter;

performing the following operations if it is determined that said user is authorized to view said second inventory data:

querying a first remote inventory management system of said first commercial entity for said first inventory data and a second remote inventory management system of said second commercial entity for said second inventory data, where the first and second remote inventory management systems are not compatible with each other;

receiving said first inventory data and said second inventory data;

generating an aggregate view comprising said first and second inventory data; and providing content of said aggregate view to a client computing device of said first commercial entity.

26. The device according to claim 25, wherein said first inventory management system and said second inventory management system employ different protocols.

27. The device according to claim 25, wherein a query for said first inventory data or said second inventory data is converted from a first protocol format to a second different protocol format during said querying step.

28. The device according to claim 25, wherein said parameter further indicates that said user is authorized to view inventory data of said second commercial entity associated with inventory residing in a facility within at least one geographic location or geographic region.

29. The device according to claim 25, wherein said parameter further indicates that said user is authorized to view inventory data of said second commercial entity associated with products of at least one product category.

30. The device according to claim 25, wherein said aggregate view is further generated using historical transaction information for said first commercial entity or said second commercial entity which was generated by a respective one of said first remote inventory management system or said second remote inventory management system.

31. The device according to claim 25, wherein said computing device is further caused to:
   determine at least one set of inventory data of at least two different entities that should be suggested to a user of said client computing device for purposes of creating said aggregate view; and
   provide information identifying said set of inventory data to said client computing device.

32. The device according to claim 25, wherein said computing device is further caused to:
   receive a first transaction message comprising inventory-related transaction data that was obtained from a second transaction message generated by said first or second remote inventory management system; and
   store said inventory-related transaction data in a data store as historical transaction data that may be used in a subsequent aggregate view creation process.

33. The device according to claim 25, wherein said computing device is further caused to:
   receive a second request from said client computing device for modifying said aggregate view based on at least one user-specified adjustment parameter;
   generate an adjusted aggregate view based on said user-specified adjustment parameter; and
   provide content of said adjusted aggregate view to said client computing device.

34. The device according to claim 25, wherein said computing device is further caused to generate analytical data in response to a reception of a second request for generating analytical data based on at least one of user-specified inventory data or user-specified historical transaction data.

35. The device according to claim 25, wherein said computing device is further caused to deny said first request if it is determined that said user is not authorized to view said second inventory data.

36. The device according to claim 25, wherein said computing device is further caused to perform an aggregate view creation process without said second inventory data if it is determined that said user is not authorized to view said second inventory data.

* * * * *